United States Patent
Calle

(10) Patent No.: US 10,927,562 B2
(45) Date of Patent: Feb. 23, 2021

(54) FENCE SUPPORT SYSTEM

(71) Applicant: Christopher Andrew Calle, Dallas, TX (US)

(72) Inventor: Christopher Andrew Calle, Dallas, TX (US)

( * ) Notice: Subject to any disclaimer, the term of this patent is extended or adjusted under 35 U.S.C. 154(b) by 485 days.

(21) Appl. No.: 15/593,301

(22) Filed: May 11, 2017

(65) Prior Publication Data

US 2017/0247909 A1    Aug. 31, 2017

Related U.S. Application Data

(63) Continuation-in-part of application No. 15/053,600, filed on Feb. 25, 2016.

(60) Provisional application No. 62/335,074, filed on May 12, 2016, provisional application No. 62/385,427, filed on Sep. 9, 2016, provisional application No. 62/209,750, filed on Aug. 25, 2015.

(51) Int. Cl.

| | |
|---|---|
| *E04H 17/04* | (2006.01) |
| *E04H 17/10* | (2006.01) |
| *E01F 7/00* | (2006.01) |
| *E04H 17/06* | (2006.01) |
| *E04H 17/16* | (2006.01) |
| *F16B 5/06* | (2006.01) |

(52) U.S. Cl.
CPC ........... *E04H 17/06* (2013.01); *E04H 17/161* (2013.01); *F16B 5/0664* (2013.01)

(58) Field of Classification Search
CPC ......... E04H 17/04; E04H 17/06; E04H 17/10; E04H 17/02; E01F 7/02; E01F 7/025; E01F 7/04; E01F 7/045; E01F 7/00
See application file for complete search history.

(56) References Cited

U.S. PATENT DOCUMENTS

| | | | |
|---|---|---|---|
| 3,079,969 A | 3/1963 | Buckley | |
| 3,964,197 A | 6/1976 | Tucker et al. | |
| 4,180,247 A | 12/1979 | Pfarr, Jr. | |
| 4,771,137 A * | 9/1988 | Thompson | H01B 17/145 |
| | | | 174/163 F |

(Continued)

FOREIGN PATENT DOCUMENTS

| | | | | |
|---|---|---|---|---|
| DE | 2 161 307 | * | 6/1973 | ............. E04H 17/10 |
| EP | 0 522 033 | * | 10/1991 | ............. E04G 21/28 |

(Continued)

OTHER PUBLICATIONS

"Roll Up Fence—Portable Barrier", Omega Industrial Products, Inc., Brochure, 2014, 4 pages.

*Primary Examiner* — Michael P Ferguson
(74) *Attorney, Agent, or Firm* — Lightfoot & Alford PLLC

(57) ABSTRACT

A fence support system includes a catch member having an at least partially D-shaped protrusion and post receiver, and a retainer member having an aperture configured to receive the protrusion. A method of supporting an apertured fence material includes providing a catch member comprising an at least partially D-shaped protrusion extending from a catch plate of the catch member and receiving an end of a vertical support within the catch member, providing a retainer member comprising an aperture configured to receive the protrusion of the catch member, and capturing an apertured fence material between the catch member and the retainer member.

5 Claims, 27 Drawing Sheets

(56) References Cited

U.S. PATENT DOCUMENTS

| | | | |
|---|---|---|---|
| 5,441,239 A | | 8/1995 | Watson |
| 5,784,762 A | | 7/1998 | Huntting |
| 5,897,281 A | | 4/1999 | Haga et al. |
| 6,149,135 A | * | 11/2000 | Hlavin .................. A63B 61/003 |
| | | | 256/12.5 |
| 6,558,075 B2 | * | 5/2003 | Benedict .................... E02B 3/04 |
| | | | 256/12.5 |
| 6,583,363 B1 | * | 6/2003 | Wilson, Jr. ........... H01B 17/145 |
| | | | 174/158 F |
| 6,669,175 B2 | | 12/2003 | Snow et al. |
| 6,824,122 B2 | * | 11/2004 | Spyrakis ............... E04H 17/161 |
| | | | 256/1 |
| 7,641,179 B2 | | 1/2010 | Sherrard |
| 7,690,628 B2 | * | 4/2010 | Hewitt ...................... E01F 7/02 |
| | | | 24/20 R |
| 8,322,667 B2 | | 12/2012 | Zannoni |
| 8,523,127 B1 | | 9/2013 | Bennett |
| 8,636,266 B2 | * | 1/2014 | Gill .................... E04F 11/1855 |
| | | | 256/24 |
| 8,920,089 B1 | | 12/2014 | Stewart |
| 9,777,447 B1 | * | 10/2017 | Hipfl ....................... E02D 3/005 |
| 2007/0114506 A1 | * | 5/2007 | McNeill .................... E01F 7/02 |
| | | | 256/1 |
| 2010/0043171 A1 | | 2/2010 | Kwon |
| 2010/0101045 A1 | | 4/2010 | Val Walraven et al. |
| 2015/0194995 A1 | | 7/2015 | Fathollahi |

FOREIGN PATENT DOCUMENTS

| | | | | |
|---|---|---|---|---|
| EP | 2 608 334 | * | 6/2013 | ............. E04H 17/02 |
| FR | 2 648 194 | * | 12/1990 | ................ F16B 5/00 |
| WO | WO 2010/133713 | * | 11/2010 | ............. E04H 17/02 |

* cited by examiner

FENCE SUPPORT SYSTEM

CROSS-REFERENCE TO RELATED APPLICATIONS

This patent application is a continuation-in-part of U.S. patent application Ser. No. 15/053,600, filed on 25 Feb. 2016 and entitled "FENCE SUPPORT SYSTEM," which claims the benefit of the filing date of U.S. Provisional Patent Application Ser. No. 62/209,750, filed on 25 Aug. 2015 and entitled "FENCE SUPPORT SYSTEM," the entire content of both applications are hereby expressly incorporated by reference.

This patent application also claims the benefit of the filing date of U.S. Provisional Patent Application Ser. No. 62/335,074, filed on 12 May 2016 and entitled "FENCE SUPPORT SYSTEM," the entire content of which is hereby expressly incorporated by reference.

This patent application also claims the benefit of the filing date of U.S. Provisional Patent Application Ser. No. 62/385,427, filed on 9 Sep. 2016 and entitled "FENCE SUPPORT SYSTEM," the entire content of which is hereby expressly incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some flexible fences, such as, but not limited to, apertured fencing and/or safety fencing, is difficult to maintain in good condition and/or to terminate in a structurally beneficial and/or convenient manner.

DETAILED DESCRIPTION

Figure 1:
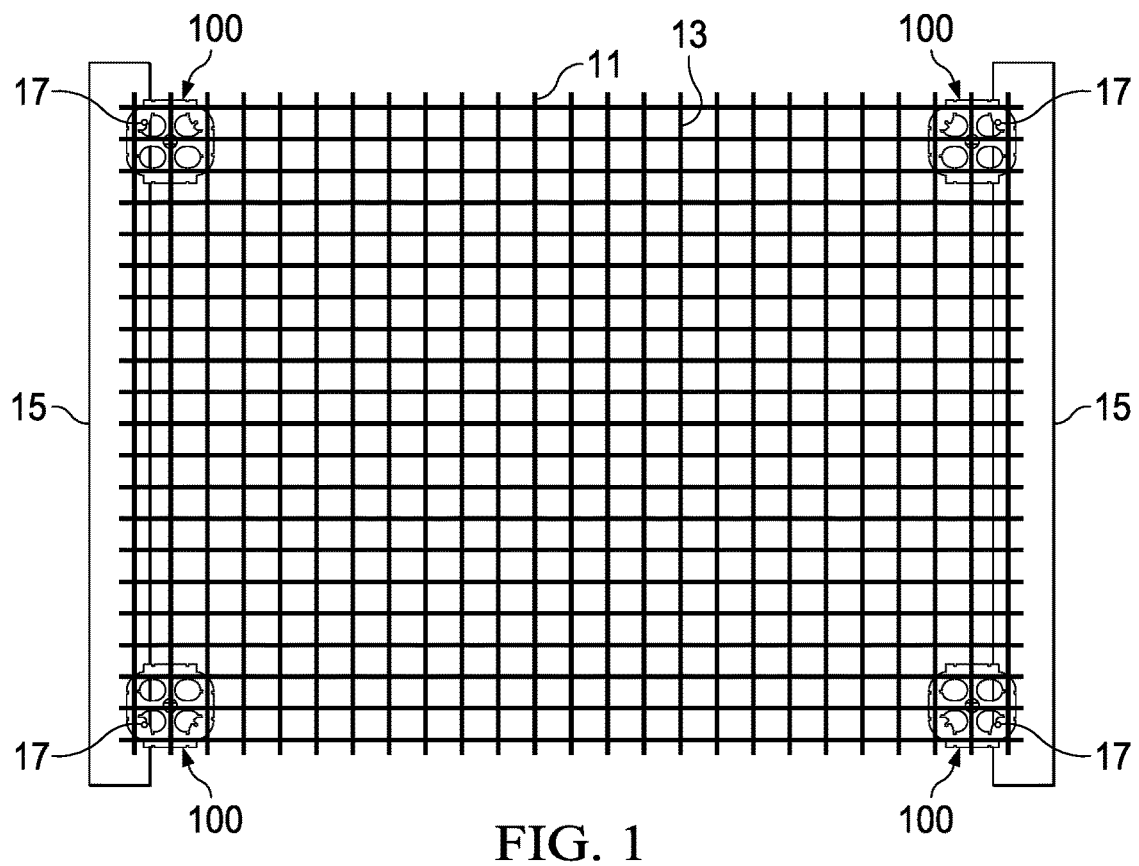
FIG. 1 is an orthogonal view of four fence support systems in use with a perforated fence material, two vertical supports, and four fasteners.

Referring now to FIG. 1, an orthogonal front view of portions of four fence support systems 100 are shown in use with an apertured fence material 11. In this embodiment, the fence material 11 comprises a grid of material pieces that together define apertures 13. In some cases, the fence material 11 may be of the sort commonly referred to as plastic security fencing, safety fencing, and the like. In alternative embodiments, the fence material 11 may comprise any other suitable shape of apertures or arrangement of spacing of apertures relative to each other so that any other suitable matrix, array, or geometric organization of apertures may be provided. In still other embodiments, the apertured fence material may be substantially a solid sheet of material with only so many apertures as necessary to complement the later described protrusions of the fence support systems 100. In this embodiment, the fence support systems 100 are connected to a vertical support 15, such as, but not limited to, a wooden post, through the use of a fastener 17. In this embodiment, the fastener comprises a nail, however, in alternative embodiments, the fastener 17 may comprise a screw, a bolt, a zip tie, a wire, or any suitable fastener, fixed point, or semi-permanently fixed point.

Figure 2:
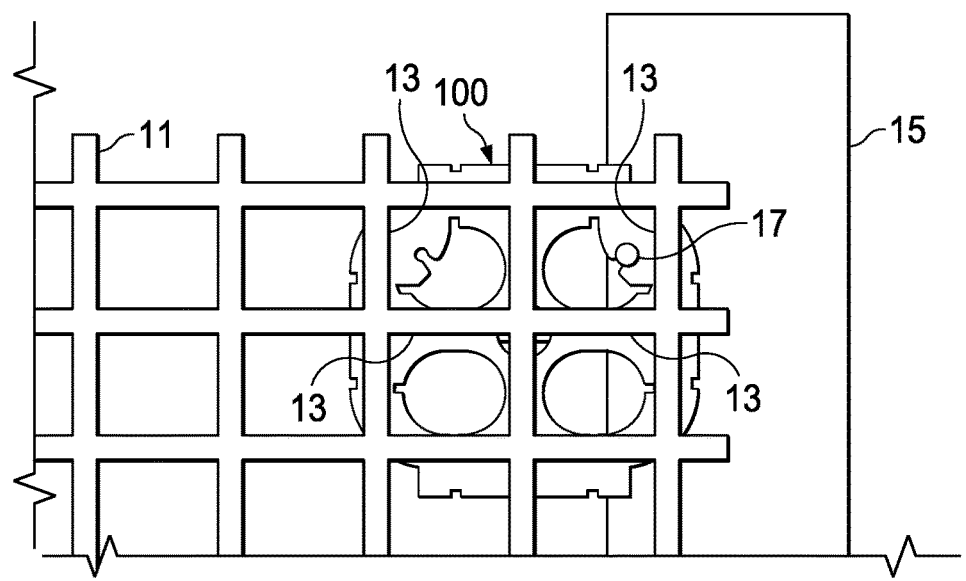
FIG. 2 is a closer orthogonal view of a fence support system in use with a perforated fence material, a vertical support, and a fastener.

Referring now to FIG. 2, a closer orthogonal front view of a fence support system 100 is shown in greater detail. While the fence support system 100 comprises a catch unit 102 and a retainer unit 104, only the catch unit 102 is shown in use with the fence material 11. As shown, the fence support system engages four apertures 13 of the fence material 11.

Figure 3:
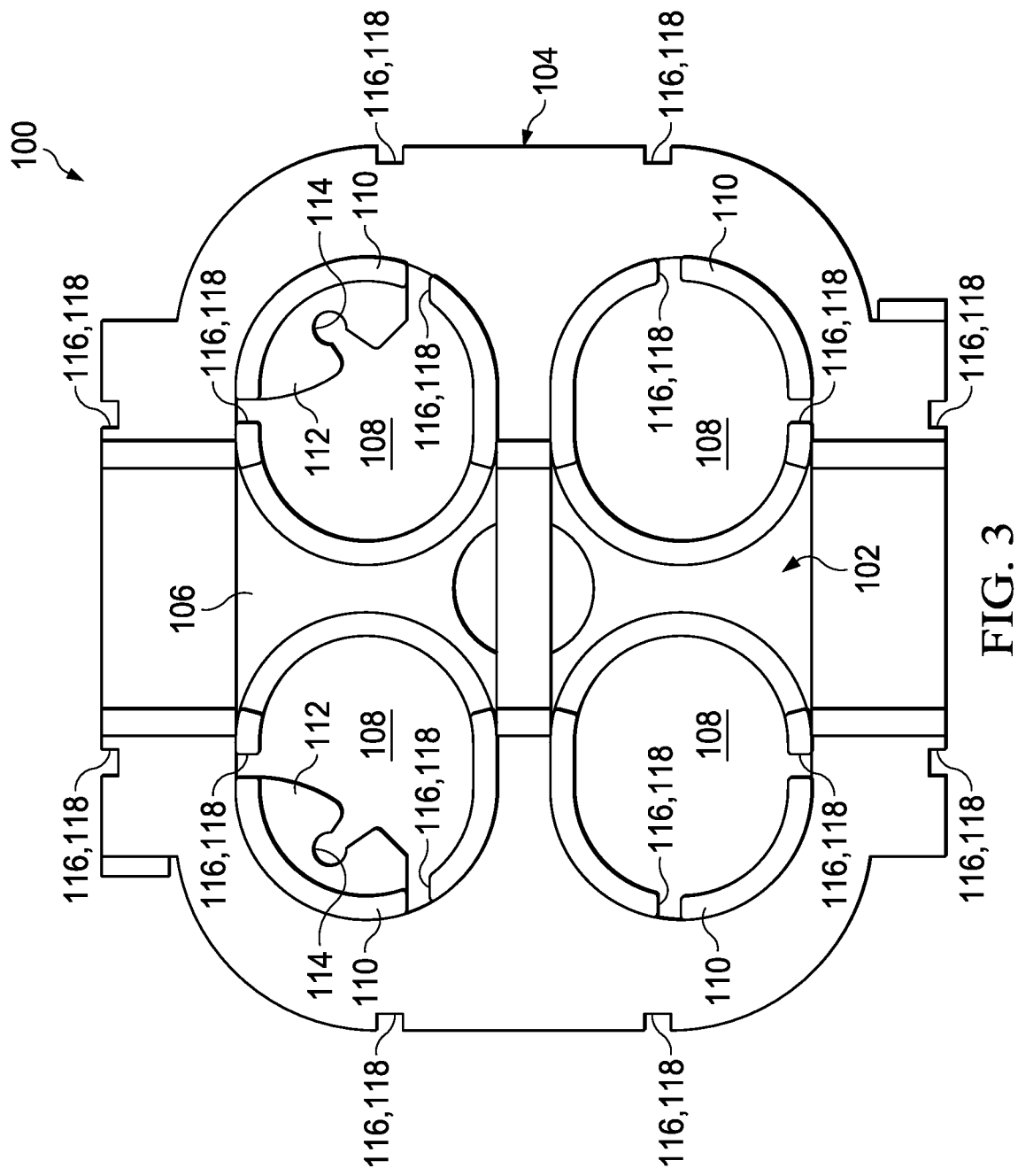
FIG. 3 is an orthogonal front view of a fence support system.
Figure 4:
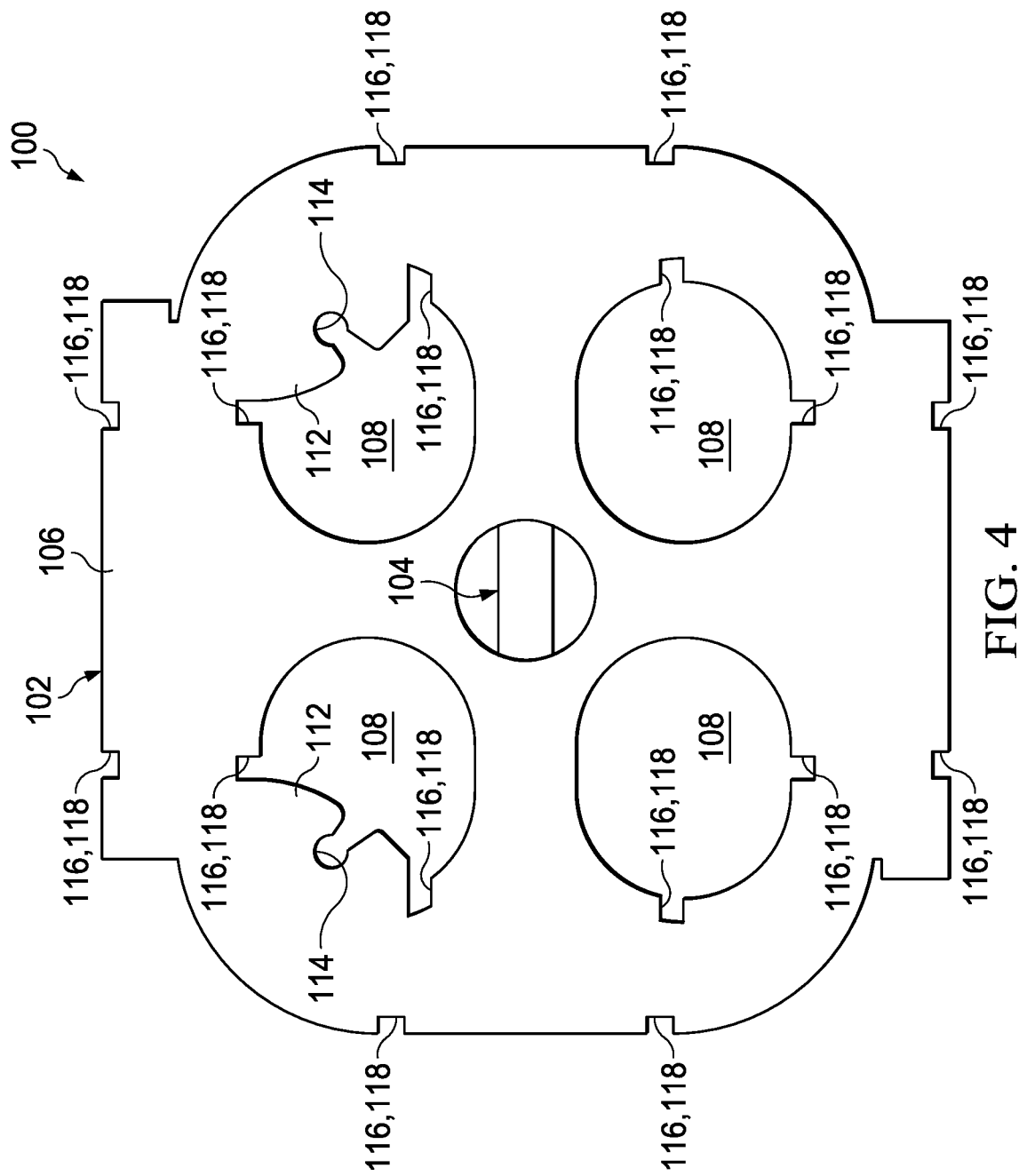
FIG. 4 is an orthogonal rear view of the fence support system of FIG. 3.
Figure 5:
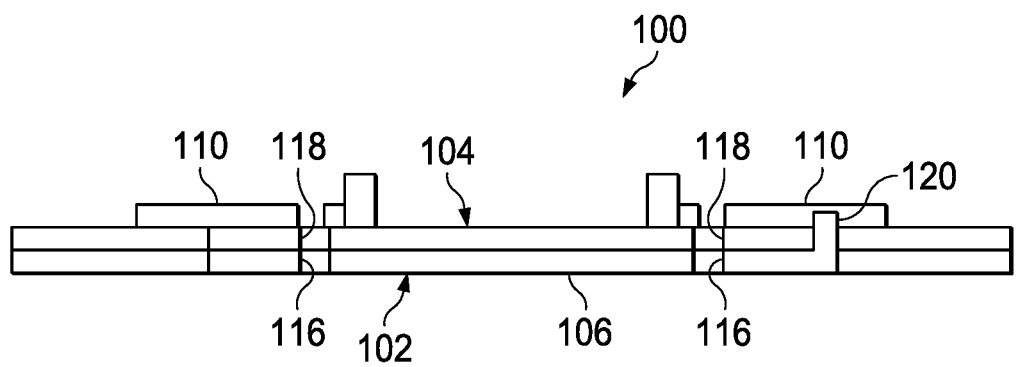
FIG. 5 is an orthogonal bottom view of the fence support system of FIG. 3.
Figure 6:
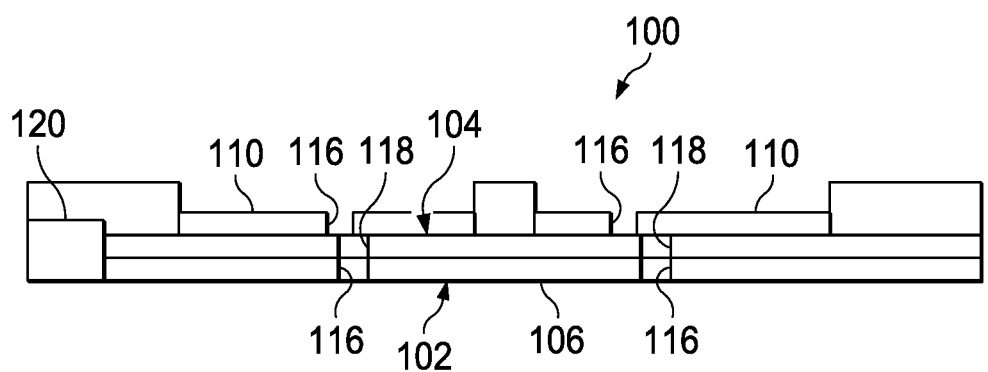
FIG. 6 is an orthogonal side view of the fence support system of FIG. 3.
Figure 7:
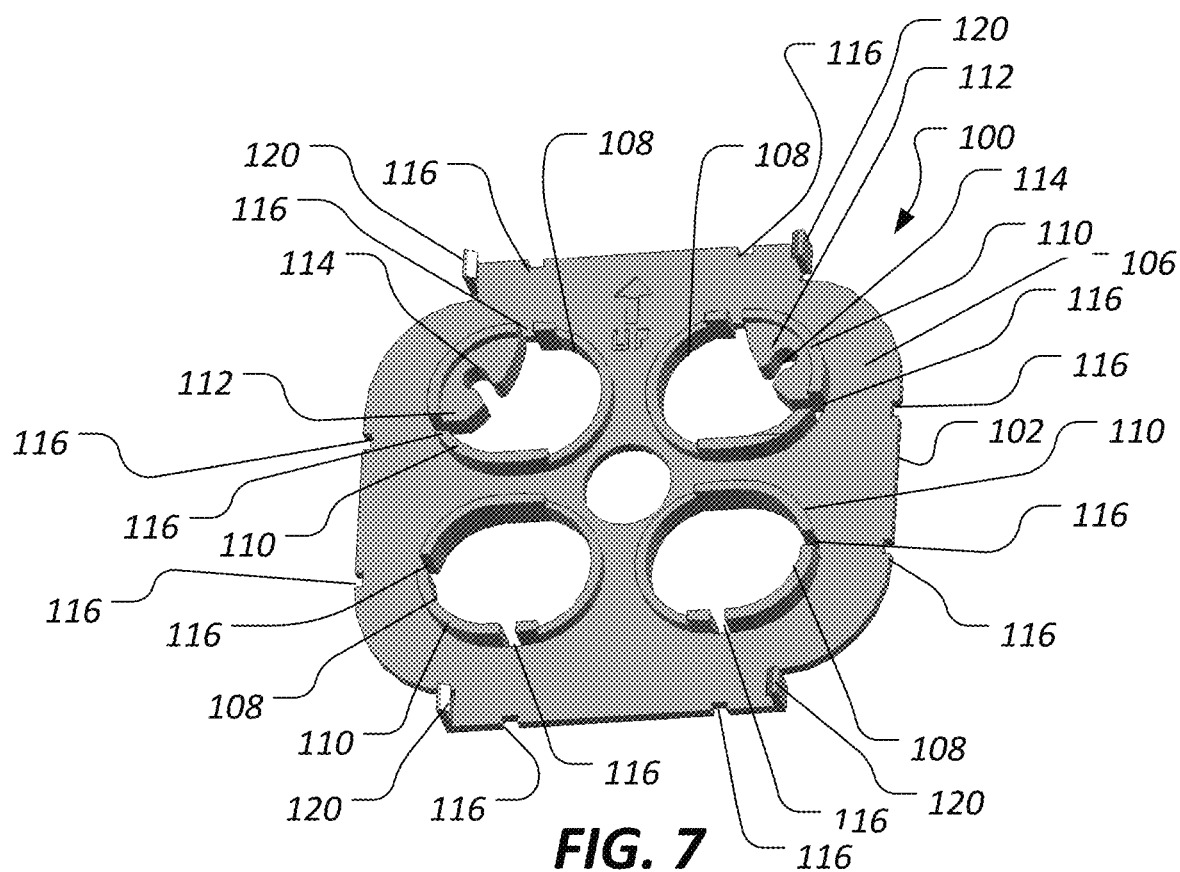
FIG. 7 is an oblique front view of a support unit of the fence support system of FIG. 3.
Figure 8:
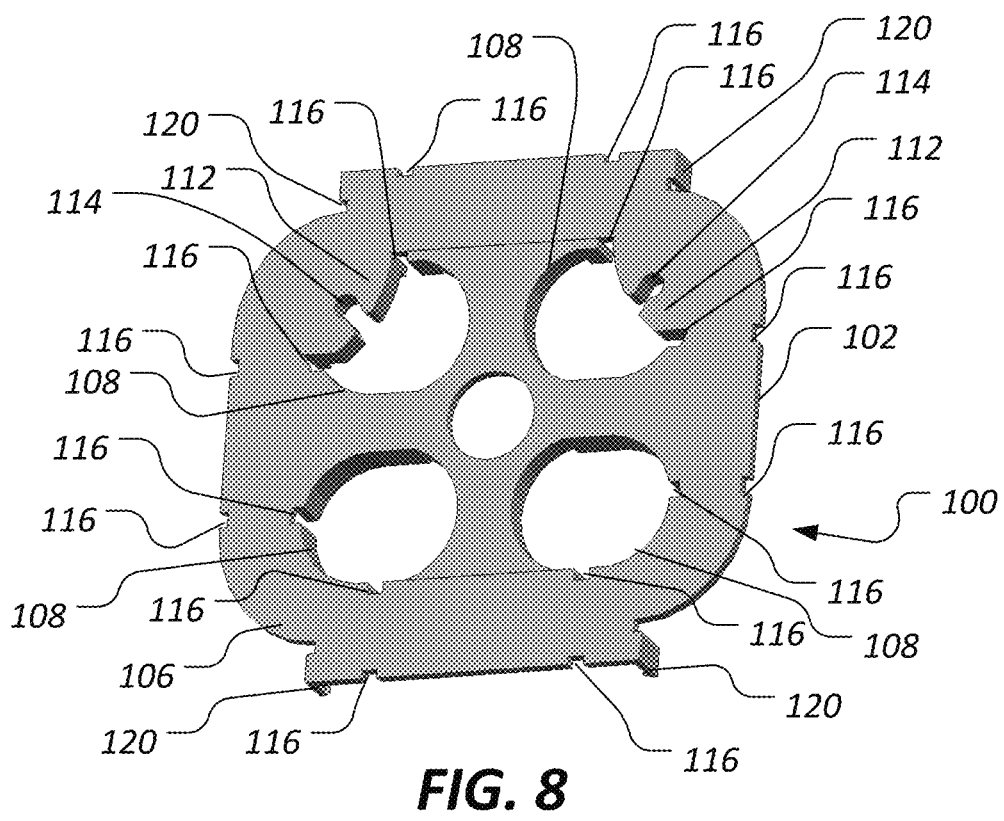
FIG. 8 is an oblique rear view of the support unit of FIG. 7.
Figure 9:
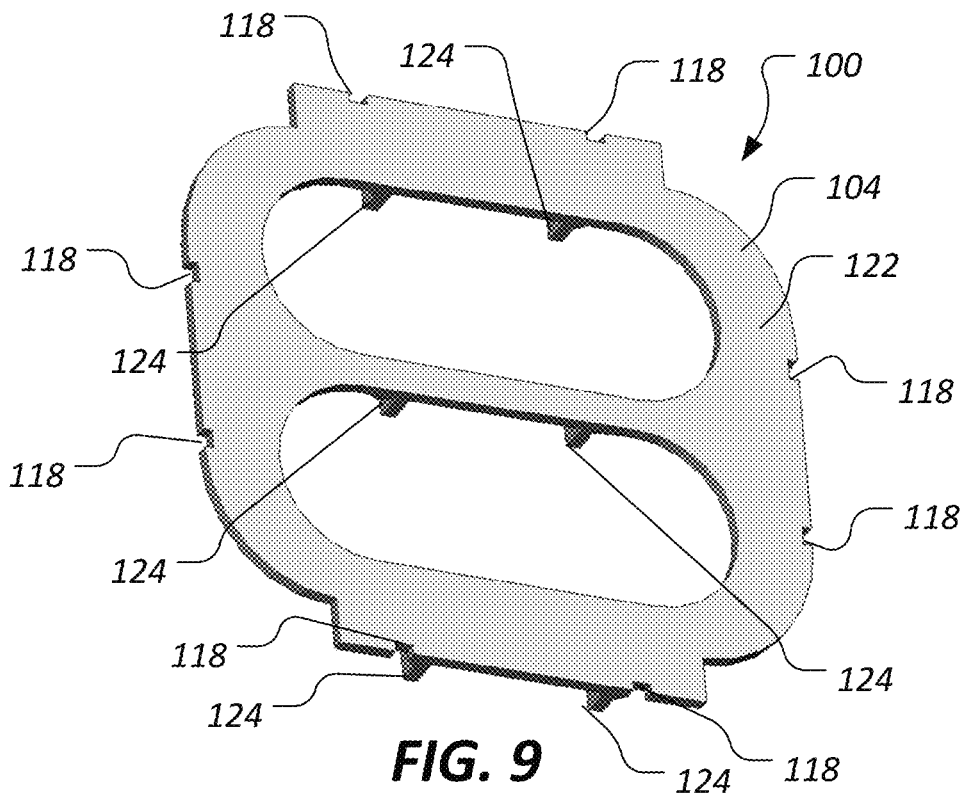
FIG. 9 is an oblique rear view of a retainer unit of the fence support system of FIG. 3.
Figure 10:
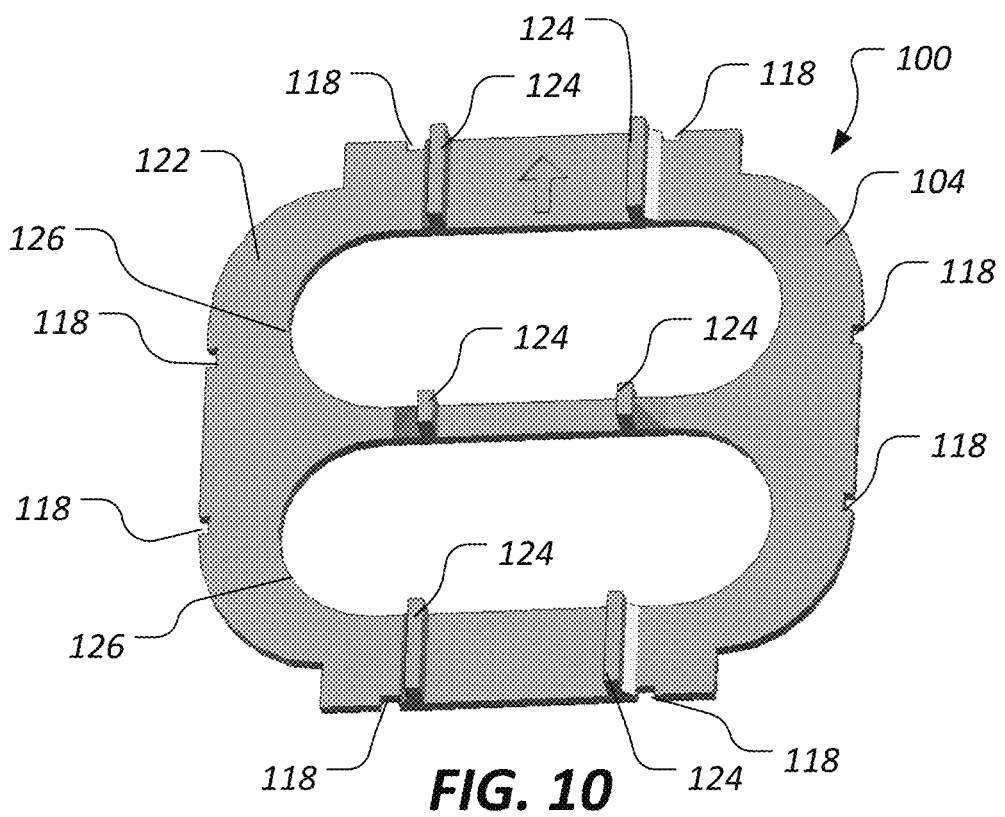
FIG. 10 is an oblique front view of the retainer unit of FIG. 9.

Referring now to FIGS. 3-10, a fence support system 100 is shown in greater detail. In this embodiment, each fence support system 100 comprises a catch unit 102 and a retainer unit 104. Most generally, the catch unit 102 is configured to comprise a catch plate 106 comprising apertures 108. In some cases, the apertures 108 may be shaped complementary to apertures 13 of fence material 11. However, in alternative embodiments, the catch plate 106 may not comprise apertures sized to complement the apertures 13. The catch plate 106 further comprises protrusions 110 sized, shaped, and/or configured relative to each other to complement one or more apertures 13. In this embodiment, the protrusions 110 extend forward from a front of the catch plate 106. The protrusions 110 generally comprise a substantially continuous raised wall that closely borders and/or at least partially forms a boundary of the apertures 108. In this embodiment, two of the apertures 108 are at least partially defined and/or obstructed by a mount tab 112 comprising a mount channel 114. The mount tabs 112 generally extend toward a center of the aperture from at least one of the catch plate 106 and/or protrusions 110. The mount channel 114 is disposed so that an opening is formed in the mount tab 112 and the opening is configured to receive a fastener 17 therein. In some embodiments, the mount channel 114 may be oriented relative to a prescribed use orientation of the fence support system 100 so that the mount channels 114 generally extend in both upward and away from a center of the fence support system 100. In this embodiment, tie notches 116 of the catch unit 102 and the complementarily disposed tie notches 118 of the retainer unit 104 are provided to accept closure devices, such as, but not limited to, zip ties, wires, string, rope, and the like to provide a primary or secondary selective joinder between the catch unit 102 and the retainer unit 104. In other words, when catch unit 102 and retainer unit 104 are mated as shown in FIGS. 3 and 4, zip ties and/or other devices can be passed through geometrically opposing notches 116 and tightened to selectively lock the catch unit 102 and retainer unit 104 relative to each other. In use, the zip ties and/or other devices would typically be applied after sandwiching fence material 11 between the catch unit 102 and the retainer unit 104. In this embodiment, the catch unit 102 further comprises one or more hooks 120 protruding forward beyond the catch plate 106. The hooks 120 are generally configured to selectively engage and/or retain a portion of the retainer unit 104. In this embodiment, the hooks 120 are formed integrally with the catch plate 106 and are inherently spring biased as a function of the material elasticity of the hooks 120 and catch plate 106. In this embodiment, retainer unit 104 comprises a retainer plate 122, walls 124 for capturing a post, such as, but not limited to, a standard T-post between left-right opposing walls 124, and the previously described notches 118. The retainer unit further comprises apertures 126 configured to receive two protrusions 110 through each aperture 126. In alternative embodiments, the protrusions 110 may comprise concave channels formed on an exterior wall of the protrusions 110. In some cases, the concave channels can assist in retaining fencing material 11 relative to the protrusions. In other alternative embodiments, the protrusions may comprise features configured to allow one or more of an interference fit between the protrusions 110 and the apertures 126 and a snap fit between the protrusions 110 and the apertures 126, in some cases, thereby reducing any need for the above-mentioned hooks 120.

Figure 11:
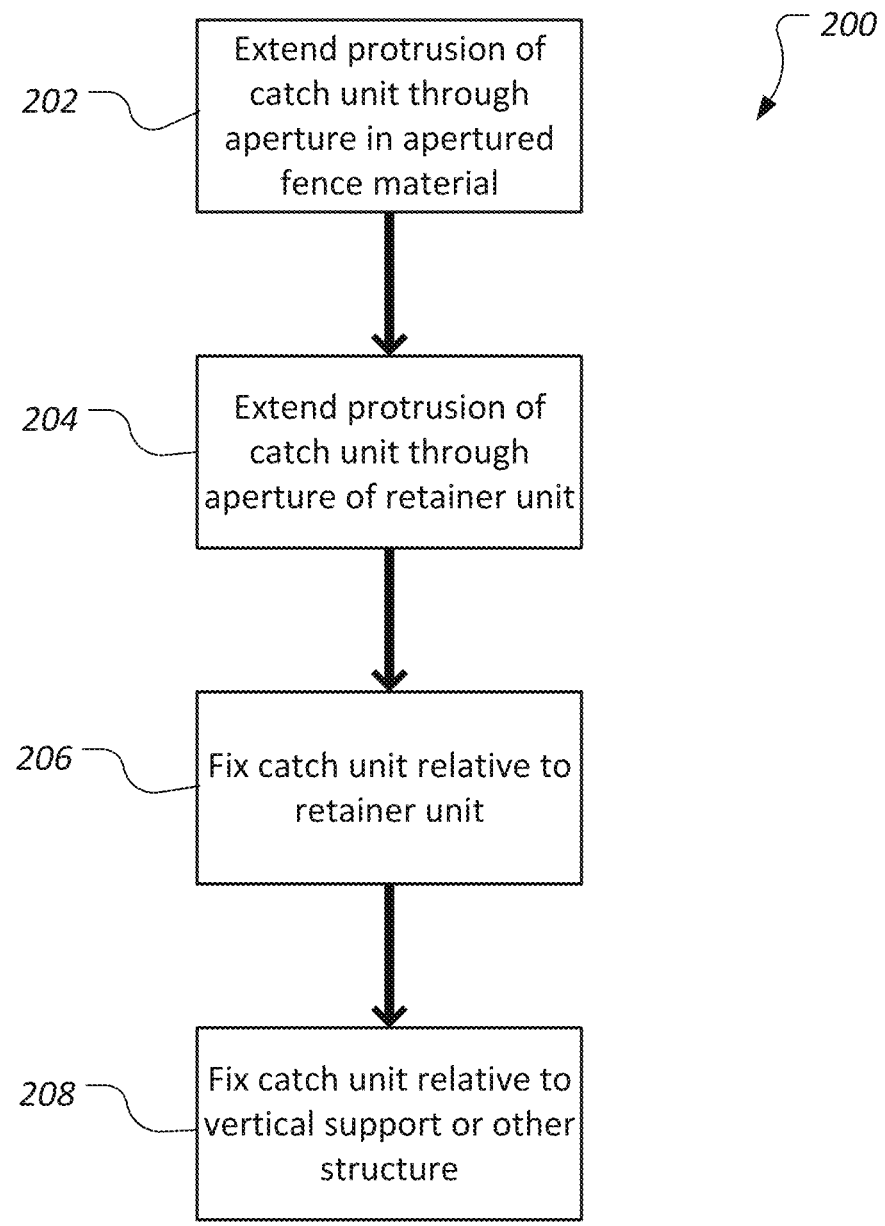
FIG. 11 is a flowchart of a method of supporting a fence.
Figure 12:
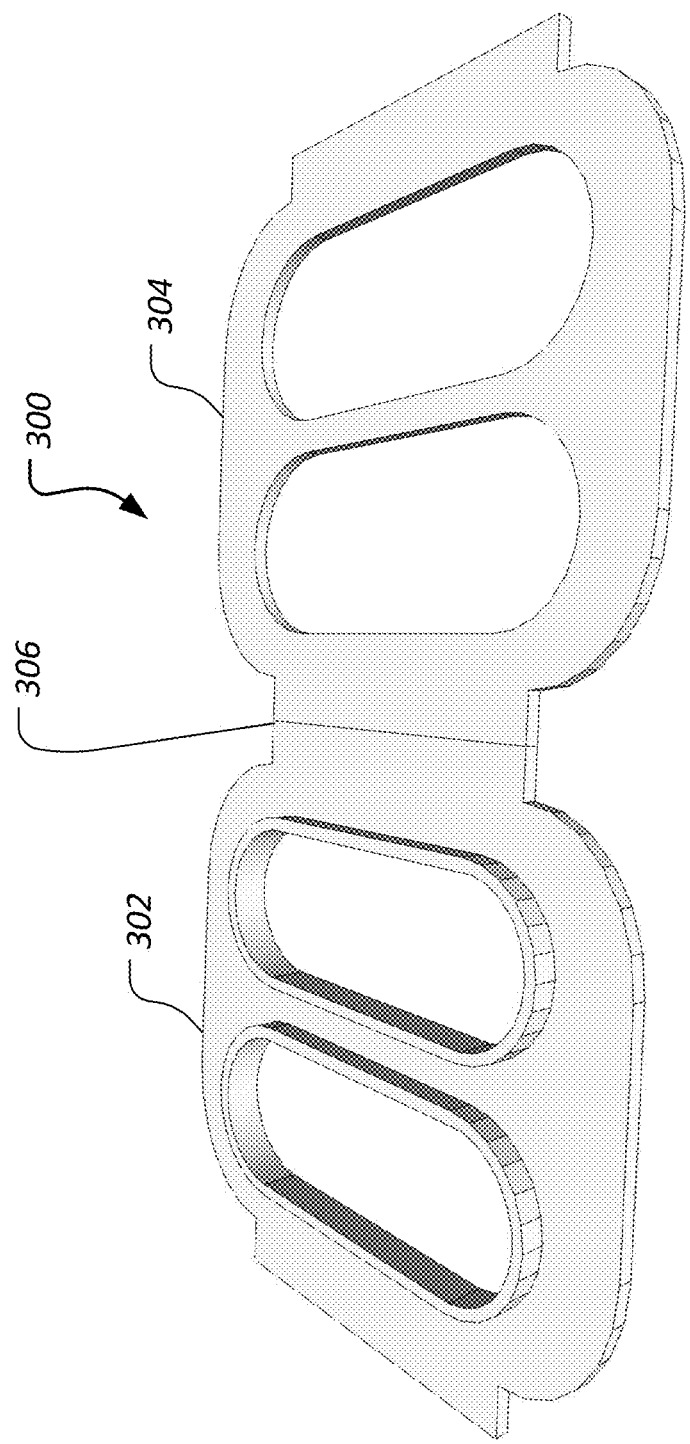
FIG. 12 is an oblique view of another fence support system in an open configuration.
Figure 13:
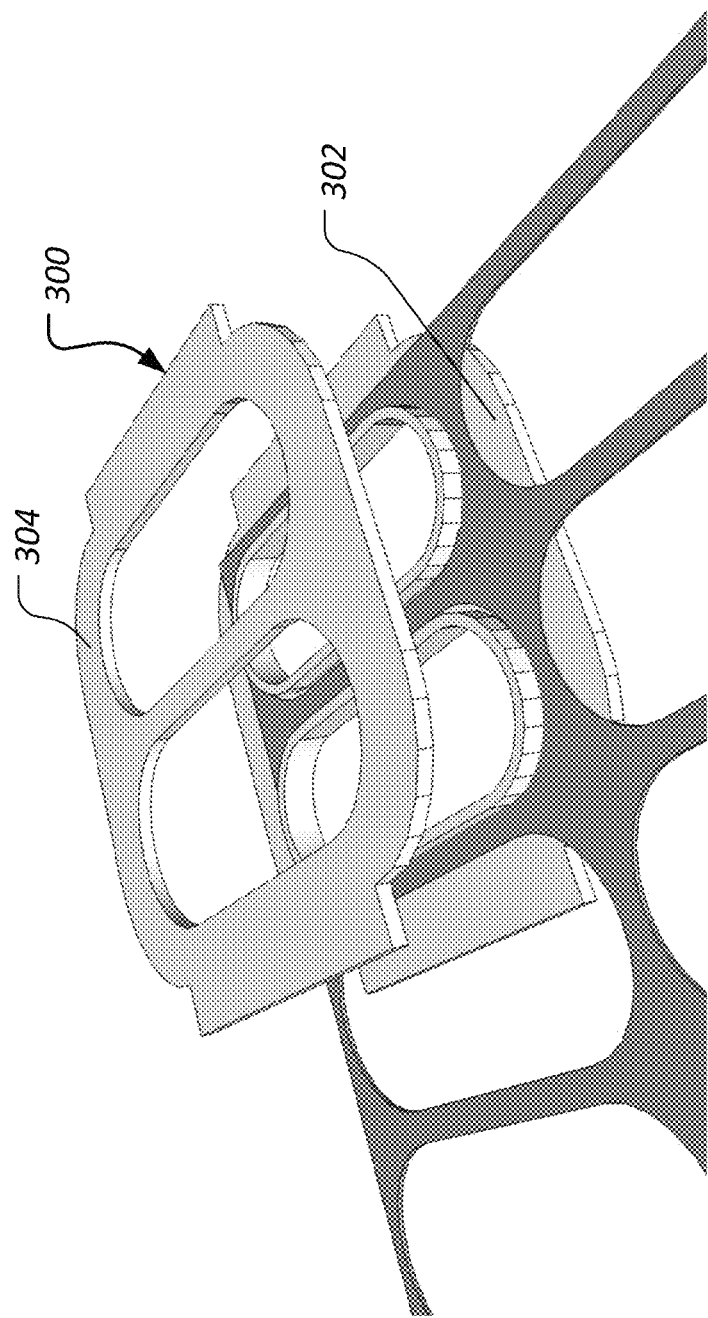
FIG. 13 is an oblique view of a fence support system in an open configuration and in relation to an apertured safety fence.
Figure 14:
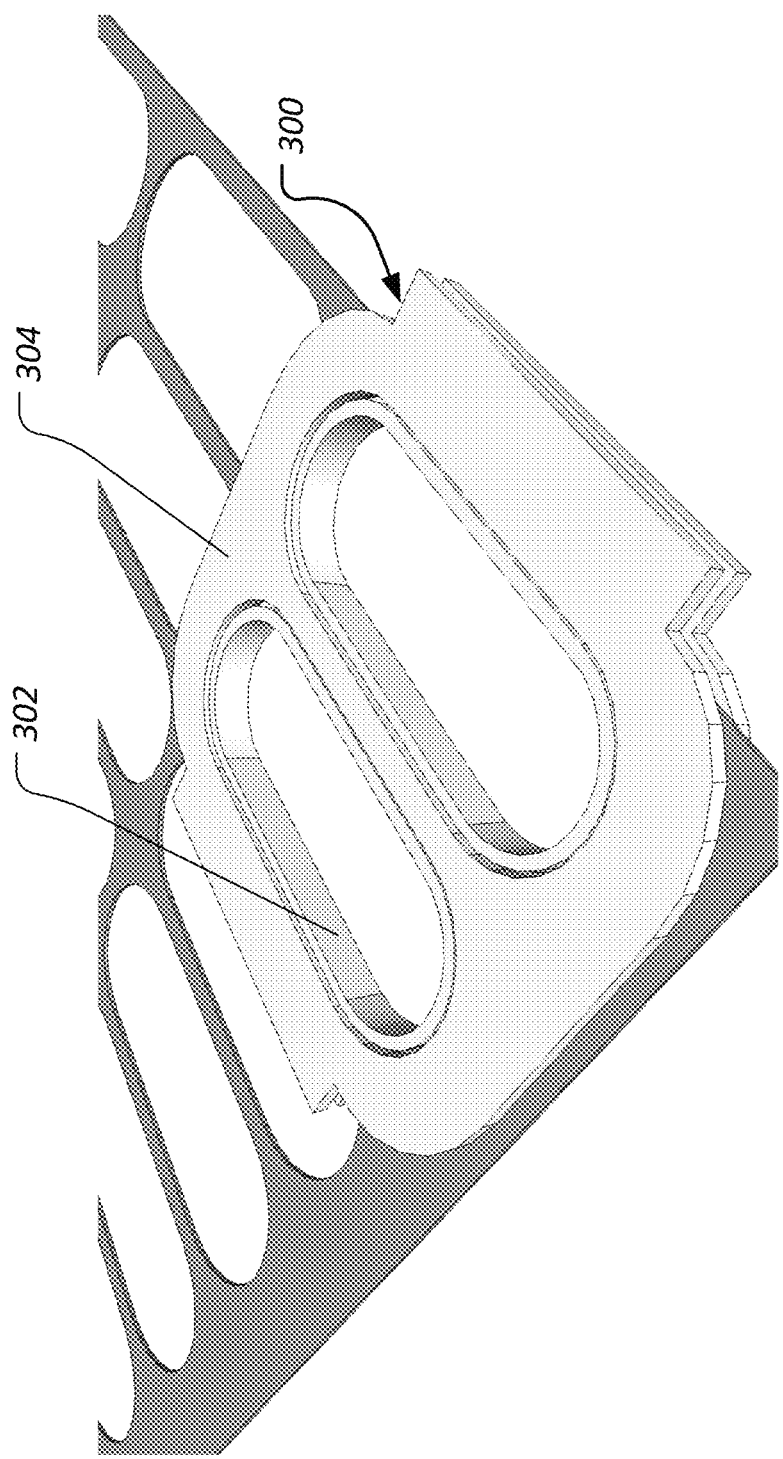
FIG. 14 is an oblique view of a fence support system in a closed configuration and attached to an apertured safety fence.
Figure 15:
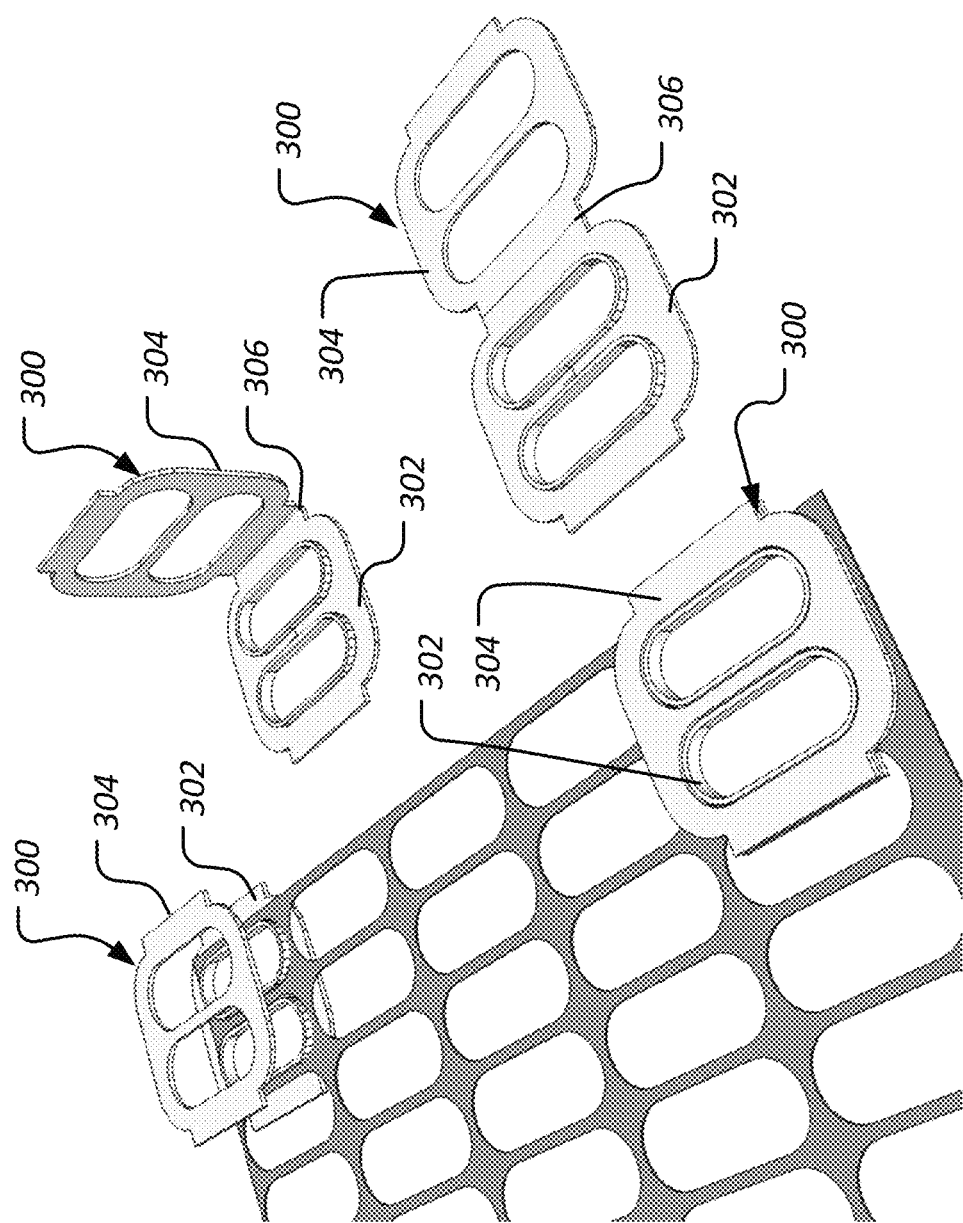
FIG. 15 is an oblique view of a plurality of fence support systems in a variety of configurations and in relation to an apertured safety fence.
Figure 16:
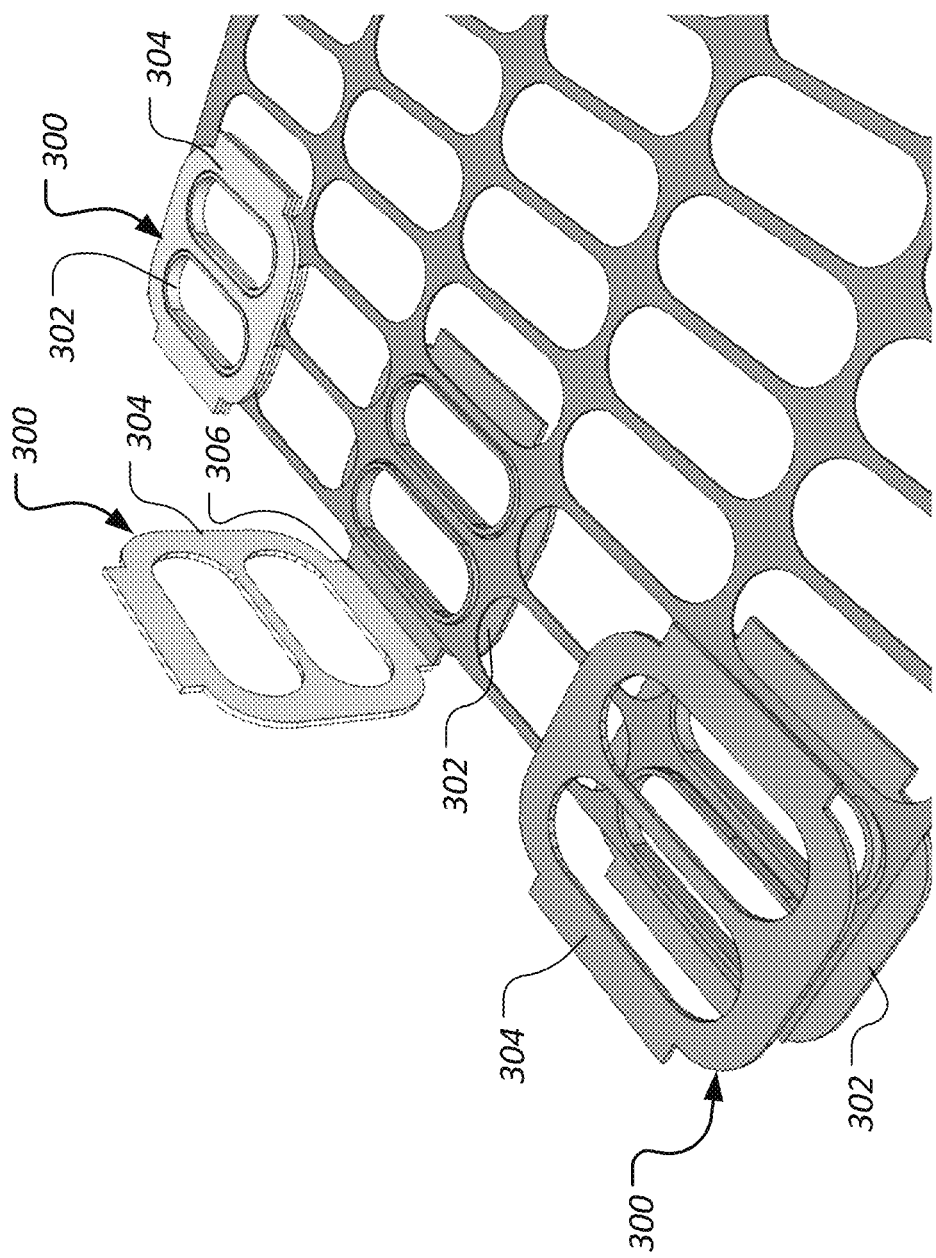
FIG. 16 is another oblique view of a plurality of fence support systems in a variety of configurations and in relation to an apertured safety fence.

Referring now to FIG. 11, a flowchart of a method 200 of supporting a fence is shown. The method 200 may begin at block 202 by extending a protrusion 110 of the catch unit 102 through an aperture 13 of apertured fence material 11. The method 200 may continue at block 204 by further extending the protrusion 110 through an aperture 126 of the retainer unit. The method 200 may continue at block 206 by fixing the catch unit 102 relative to the retainer unit 104. In some embodiments, the fixing of the catch unit 102 relative to the retainer unit 104 may comprise utilizing zip ties or other devices with notches 116,118, an interference fit between the protrusion 110 and the aperture 126, and/or a snap fit between the protrusion 110 and the aperture 126. The method 200 may continue at block 208 by vertically supporting the catch unit 102, retainer unit 104, and/or the apertured fence material 11 to a vertical support 15 or any other suitable device or structure.

Referring now to FIGS. 12-16, an alternative embodiment of a fence support system 300 is disclosed. The fence support system 300 generally comprises a catch member 302 comprising protrusions configured to complement an aperture shape of an apertured fence material. The fence support system 300 further comprises a retainer member 304 configured to complement the catch member 302 so that the protrusions of the catch member 302 can be securely received and selectively retained within apertures of the retainer member 304. In some embodiments, the protrusion of the catch member 302 can be received through the apertures of an apertured fence material and further received into the apertures of the retainer member 304 so that the apertured fence material is sandwiched between the catch member 302 and the retainer member 304. In some cases, the apertured fence material can be handled by the attached fence support system 300. In some cases, the fence support system 300 can distribute forces to the aperture fence material in a relatively more distributed manner as compared to handling the aperture fence material without a fence support system 300 applied and/or attached. Accordingly, a fence comprising the apertured fence material can last longer and be handled more conveniently. In some embodiments, the catch member 302 is movably attached to the retainer member 304 via a hinge 306. While the apertures and protrusions shown are substantially oval-shaped, in alternative embodiments, the protrusions may alternatively be formed complementary to any other shape and/or pattern of shapes configured to complement the shapes and/or patterns of apertures of apertured safety fences. In still other embodiments, the protrusions may alternatively be formed without respect to a shape and/or pattern of shapes of an apertured fence material but may nonetheless be sized relative to one or more apertures of the apertured fence material so that the protrusion can be inserted into an aperture, even if the apertured fence material must be stretched to accommodate the protrusion.

Figure 17:
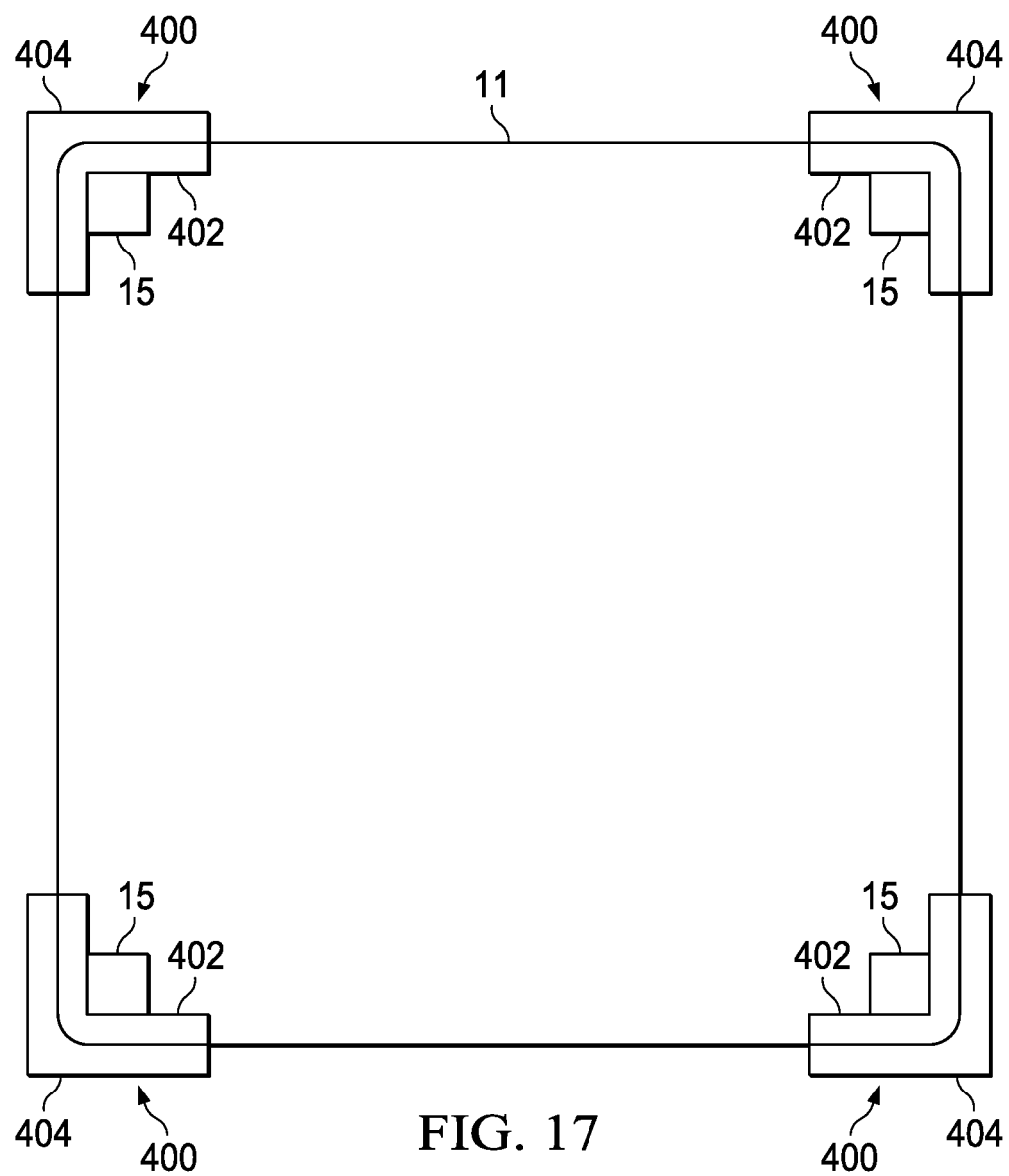
FIG. 17 is an orthogonal top view of four fence support systems in use with an apertured fence material and four vertical supports.
Figure 18:
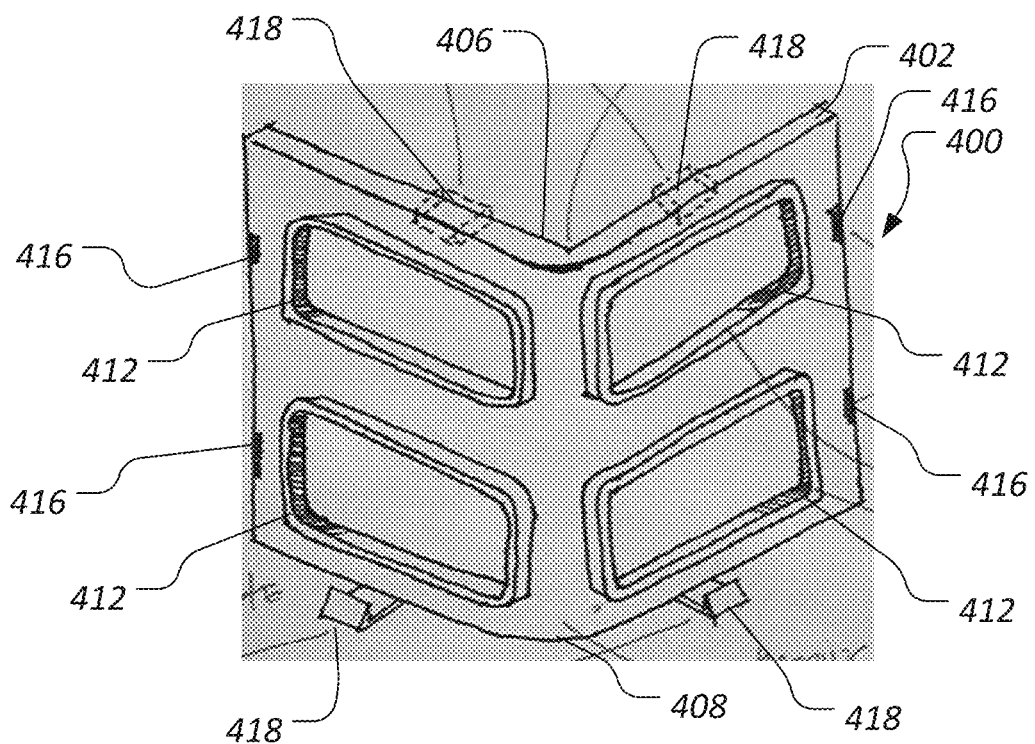
FIG. 18 is an oblique front view of a catch unit of another fence support system.
Figure 19:
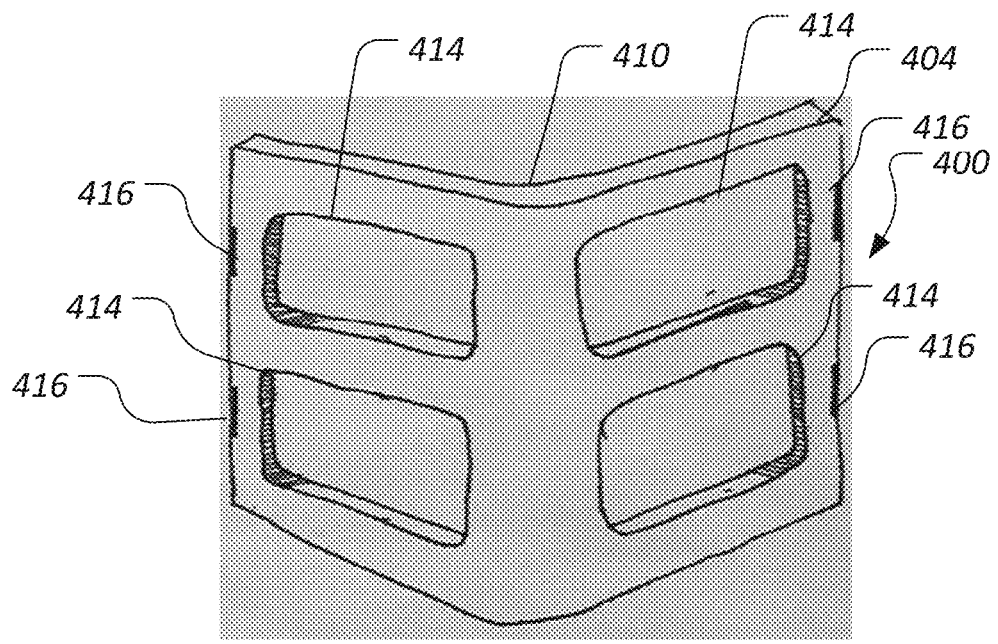
FIG. 19 is an oblique front view of a retainer unit of the fence support system of FIG. 17.
Figure 20:
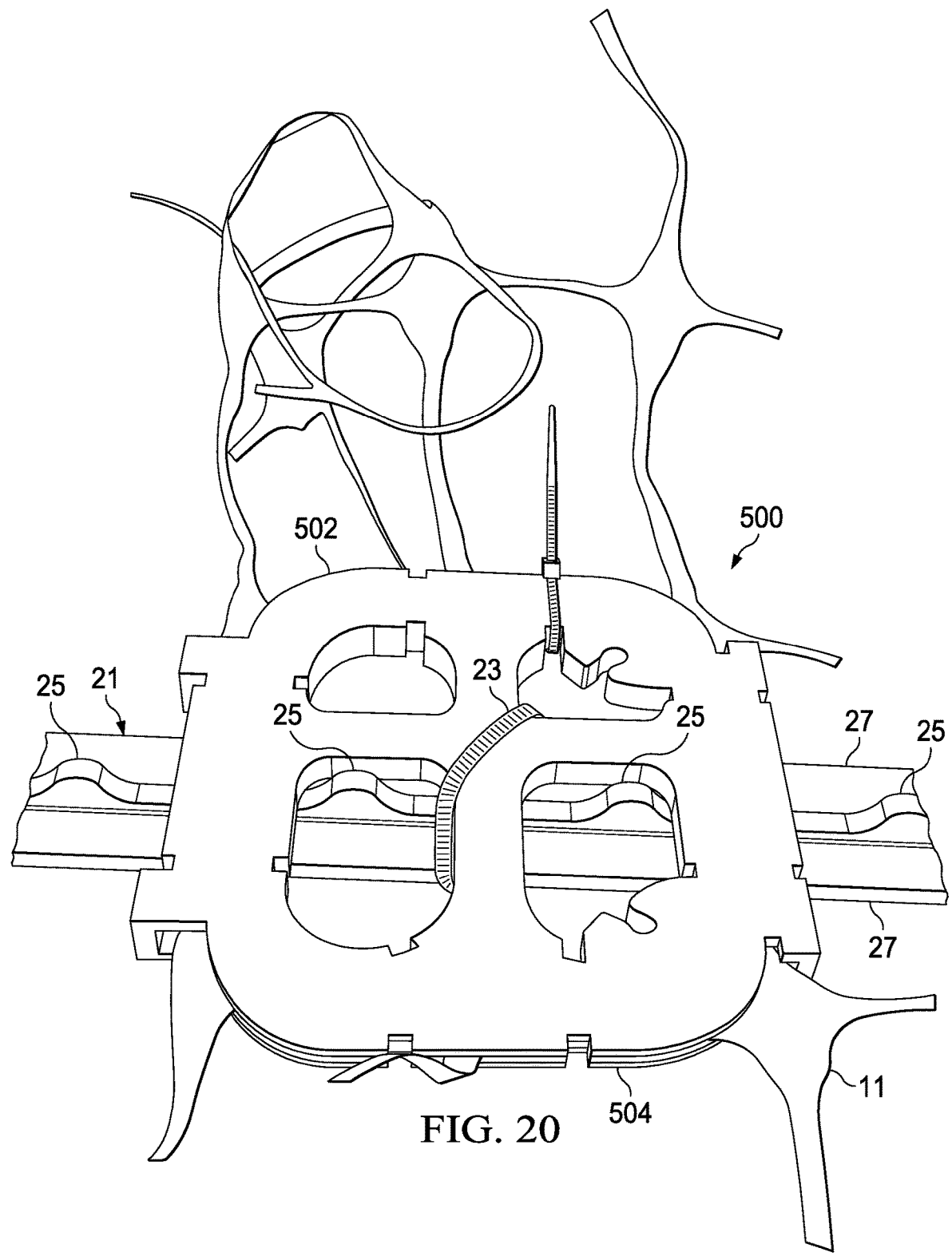
FIGS. 20-26 show an alternative embodiment of a fence support system configured for attachment to a T-post.
Figure 21:
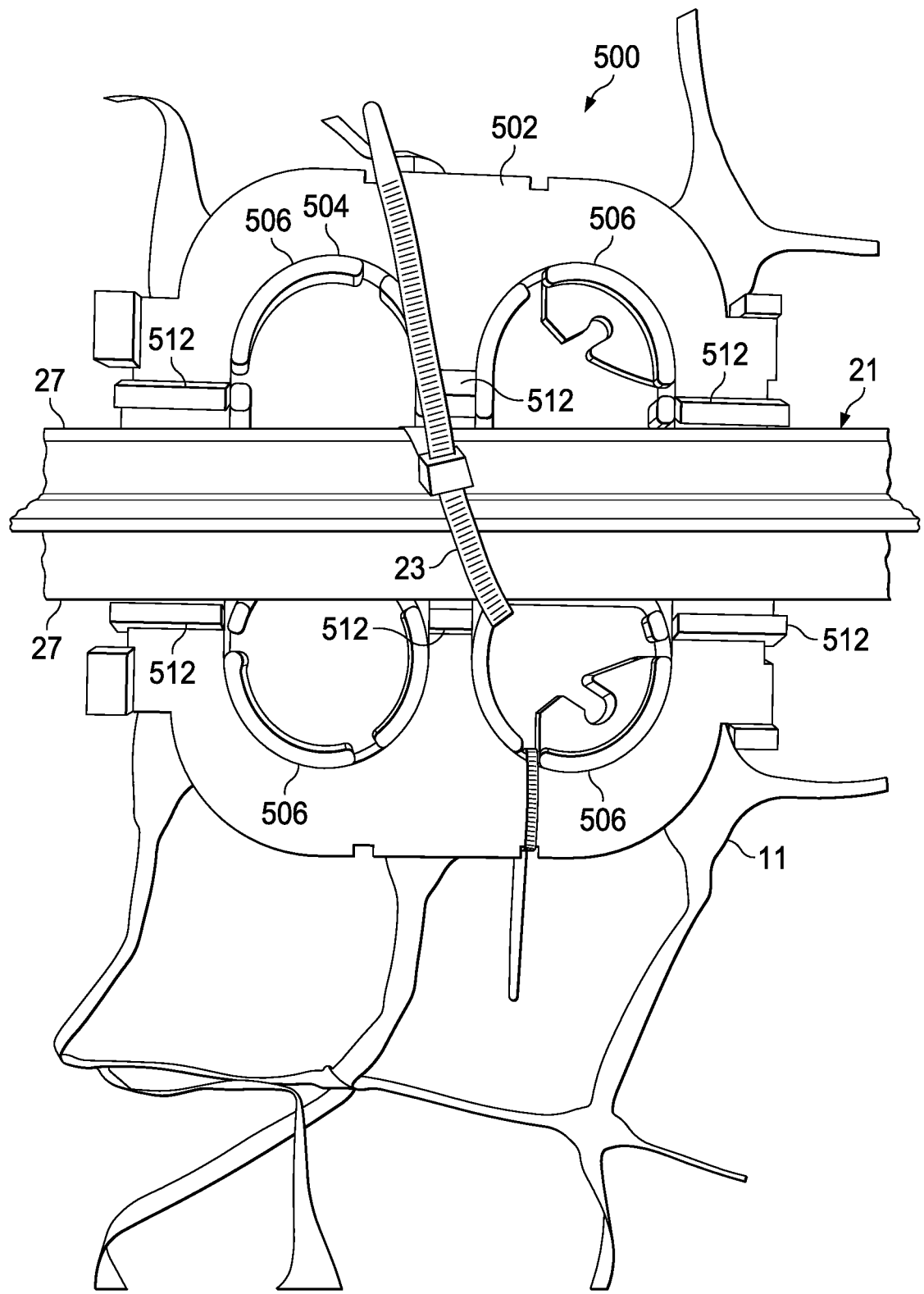
Figure 22:
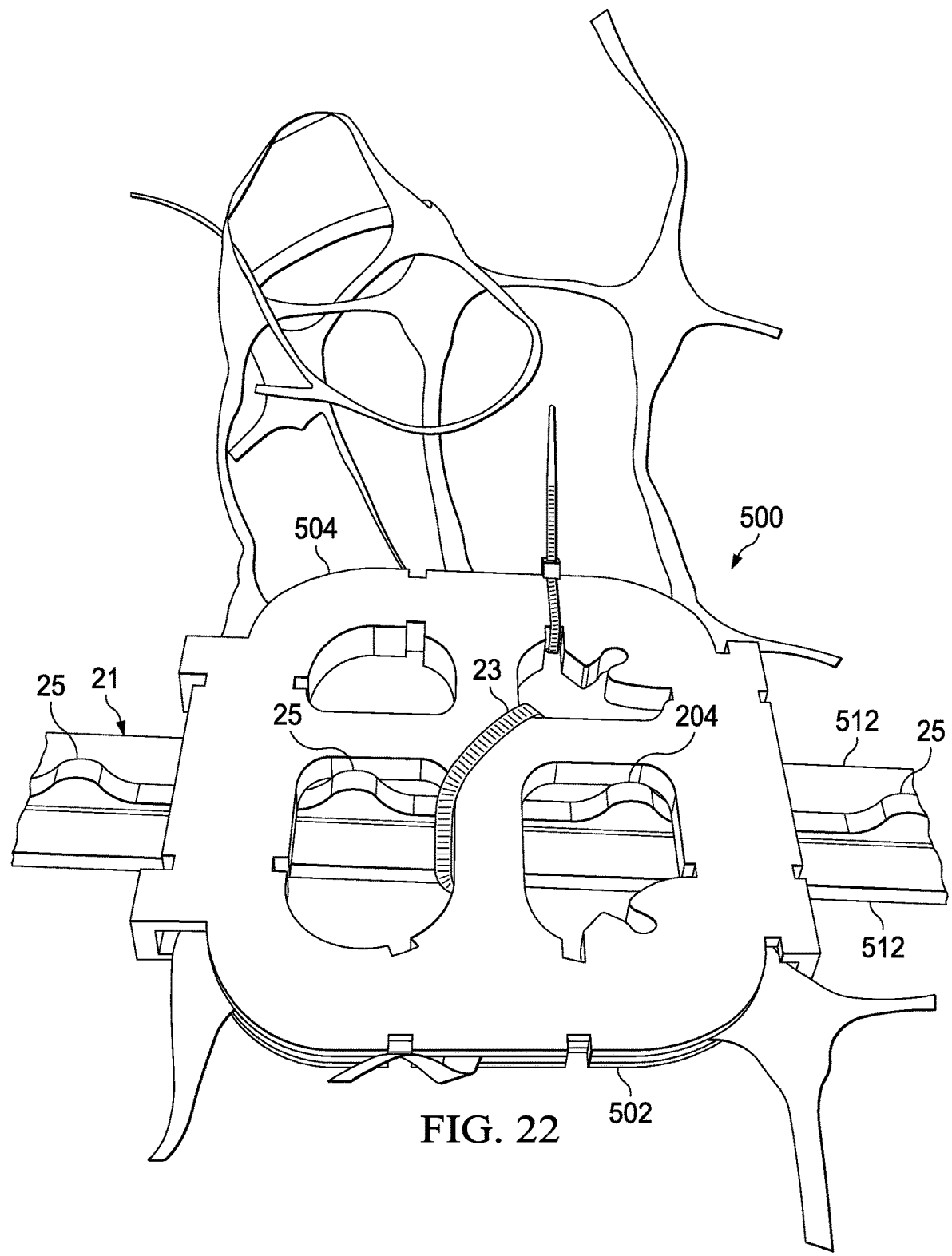
Figure 23:
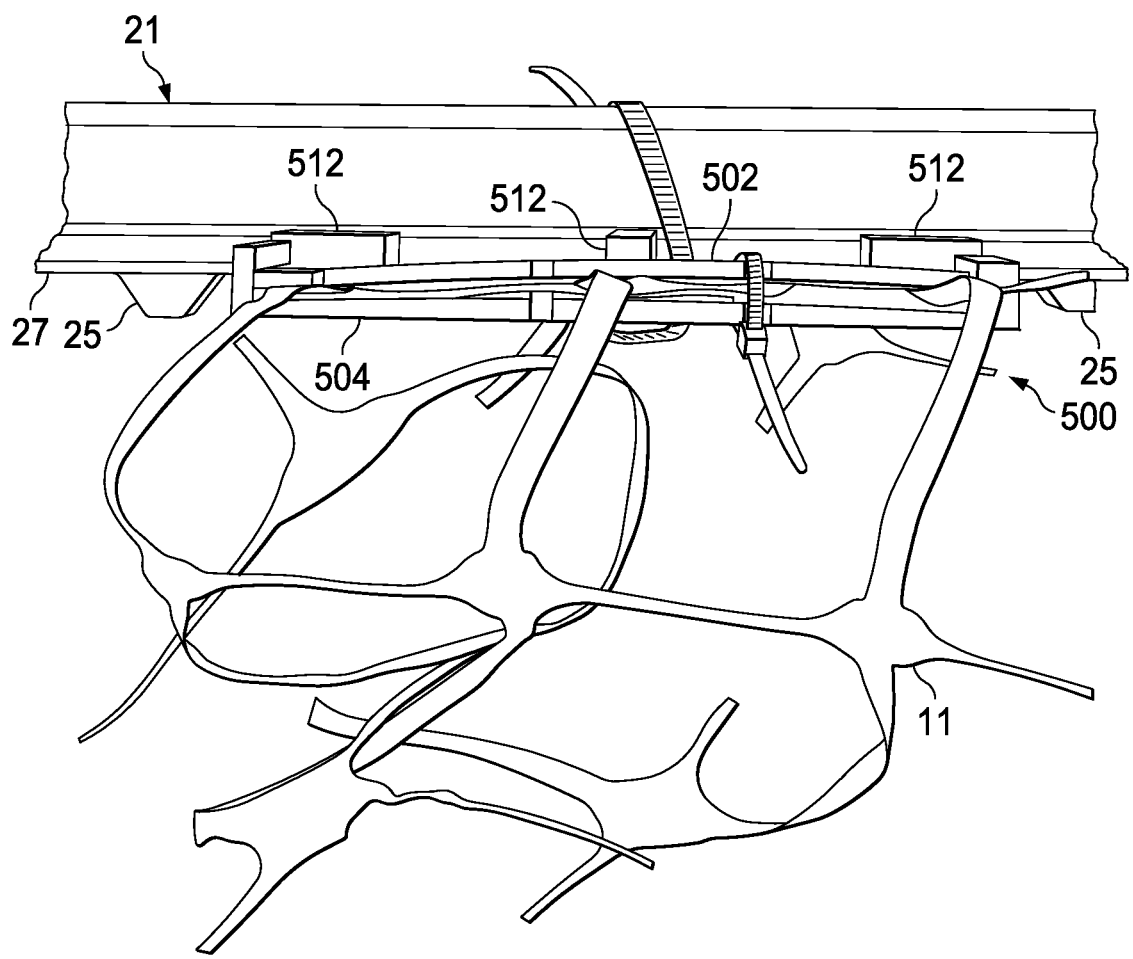

Referring now to FIGS. 17-19, an alternative embodiment of a fence support system 400 is shown. FIG. 17 shows four fence support systems 400 in use with four vertical supports 15 and apertured fence material 11. As shown, the fence support systems 400 can be utilized to provide a departure in angle or direction of fence material so that, as viewed from above, other than straight fences can be supported. As shown, the fence support systems 400 are configured to provide right angle directional changes in apertured fence material 11 captured by the fence support systems 400. In some cases, the fence support systems 400 can be utilized to effectively define an enclosed area within the bounds of the supported apertured fence material 11. The fence support system 400 is substantially similar to fence support systems 100 and 300 insofar as the manner in which apertured fence material is captured within the fence support system 400. More specifically, the fence support system 400 comprises a catch unit 402 and a retainer unit 404. The catch unit 402 generally comprises an inner profile 406 comprising a right angle interface configure for contact with box-shaped vertical supports 15. The catch unit 402 further comprises a curved radius outer profile 408 configured to interface apertured fence material 11. The retainer unit 404 comprises a curved radius inner profile 410 generally complementary to the outer profile 408. The catch unit 402 comprises protrusions 412 shaped generally complementarily to apertures 414 of the retainer unit. The catch unit 402 and the retainer unit 404 may further comprise notches 416 and hooks 418 for selectively retaining the catch unit 402 relative to the retainer unit 404.

Figure 24:
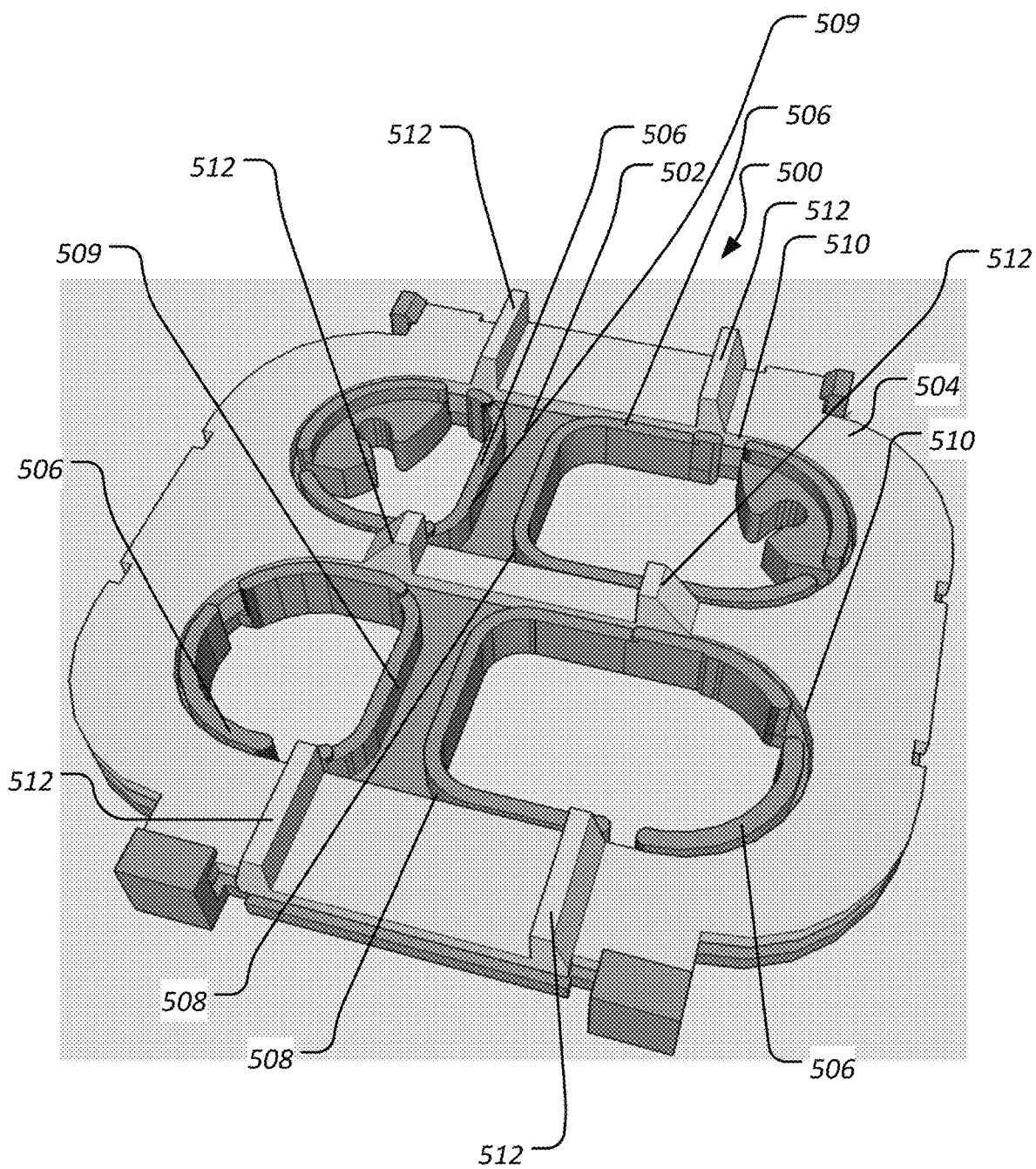
Figure 25:
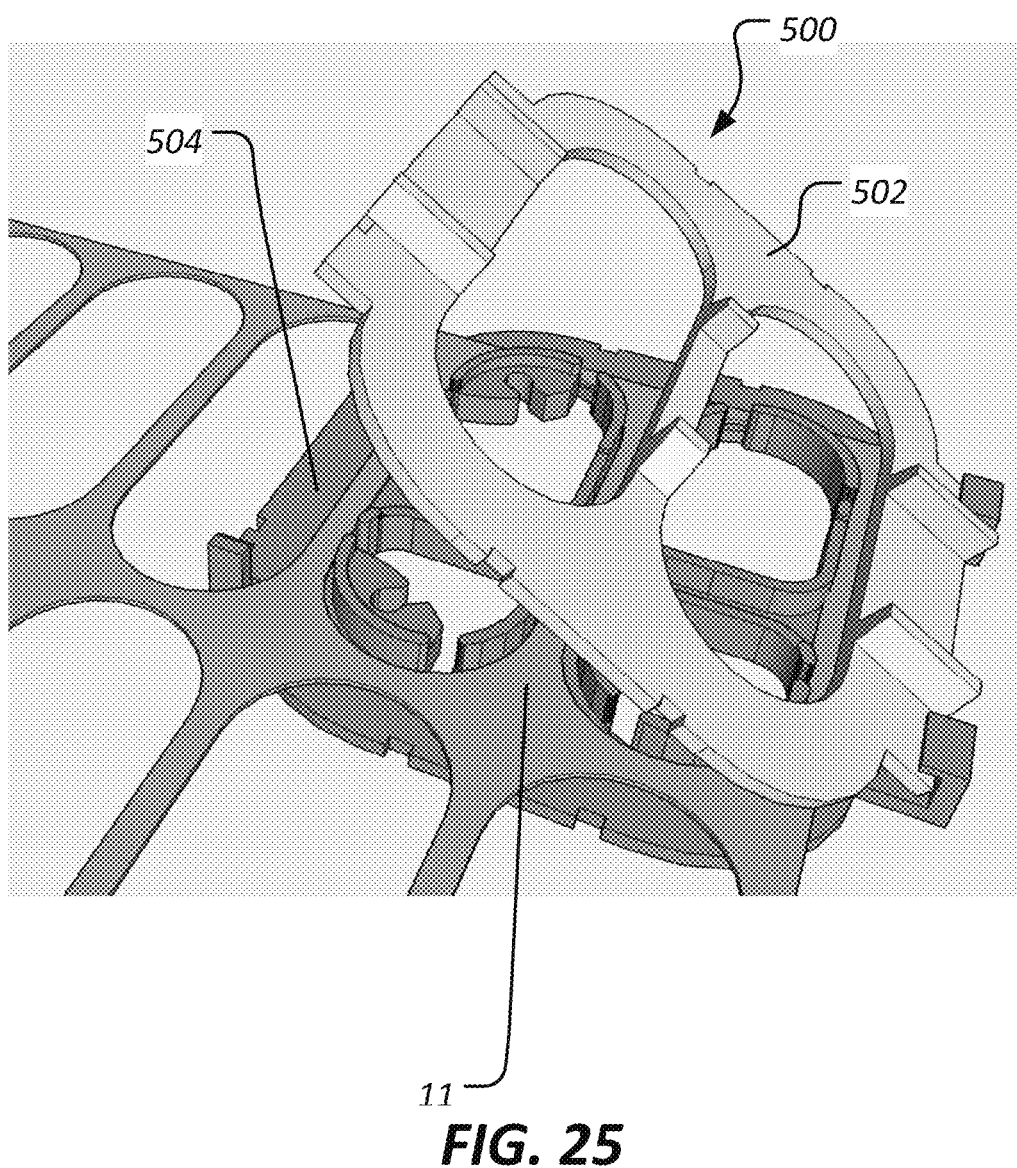
Figure 26:
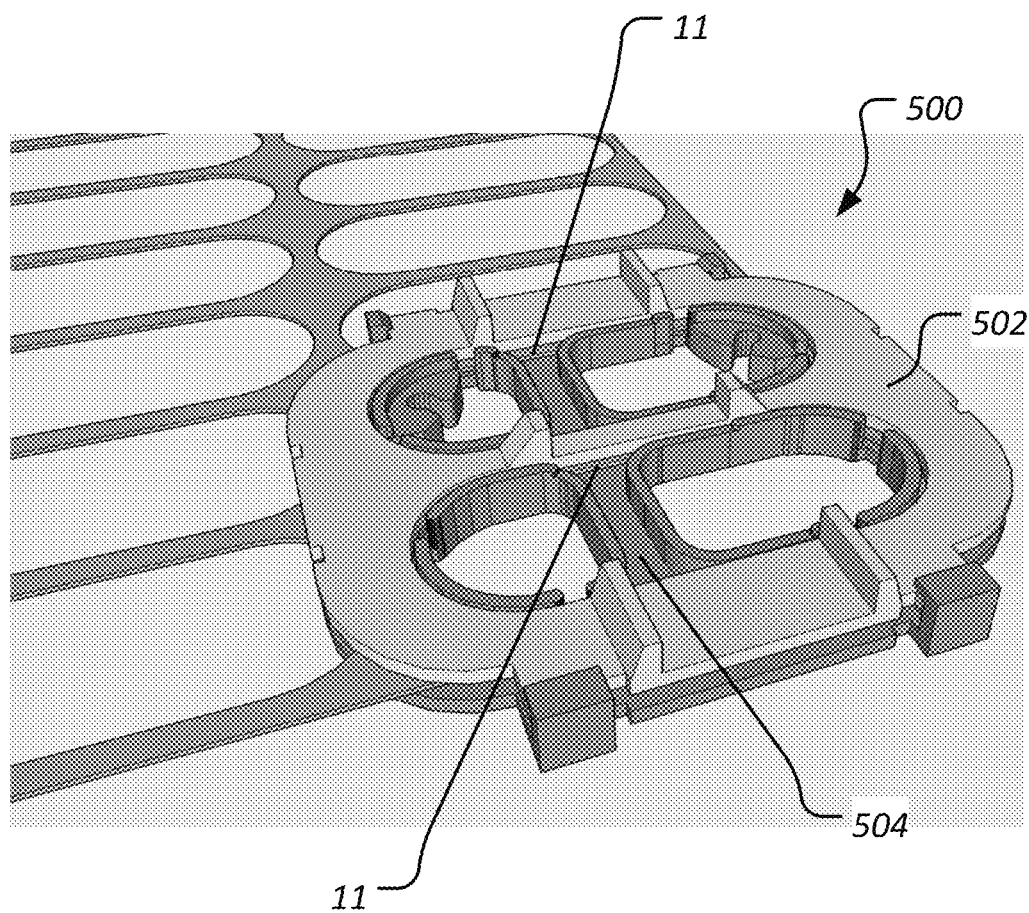

Referring now to FIGS. 20-23, a fence support system 500 is disclosed and shown as capturing fence material 11 and being secured to a T-post 21 using a zip tie fastener 23. FIGS. 24-26 are additional views of the fence support system 500 but without being installed to a T-Post 21. The T-post 21 comprises bumps 25 and edges 27. The fence support system 500 generally comprises an insert member 504 comprising protrusions 506 configured to complement an aperture shape of an apertured safety fence. The fence support system 500 further comprises a clasp member 502 configured to complement the insert member 504 so that the protrusions of the insert member 504 can be securely received and selectively retained within apertures of the clasp member 502. In some embodiments, the protrusion 506 of the insert member 504 can be received through the apertures of an apertured safety fence and further received into the oval-shaped apertures 510 of the clasp member 502 so that the apertured safety fence material 11 is sandwiched or captured between the insert member 504 and the clasp member 502. While the apertures 510 shown are substantially oval-shaped, the protrusions 506 are segmented and form D-shaped profiles, namely, a larger D-shaped profile 508 and a smaller D-shaped profile 509. The fence support system 500 is disclosed as being configured for attachment to a standard T-post 21 that comprises edges 27 and bumps 25. Walls 512 are configured to bound the T-post 21 edges 27 and the bumps 25 can be received through D-shaped apertures formed by the protrusions 506. The system 500 is configured so that when abutted against the T-post 21 with the bumps 25 received through the apertures and edges 202 bound by the walls 512, the system 500 is substantially restrained from movement along the lateral length of the T-post 21 as a function of potential interference with the bumps 25. Operation of the fence support system 500 is substantially similar to operation of fence support system 100.

Figure 27:
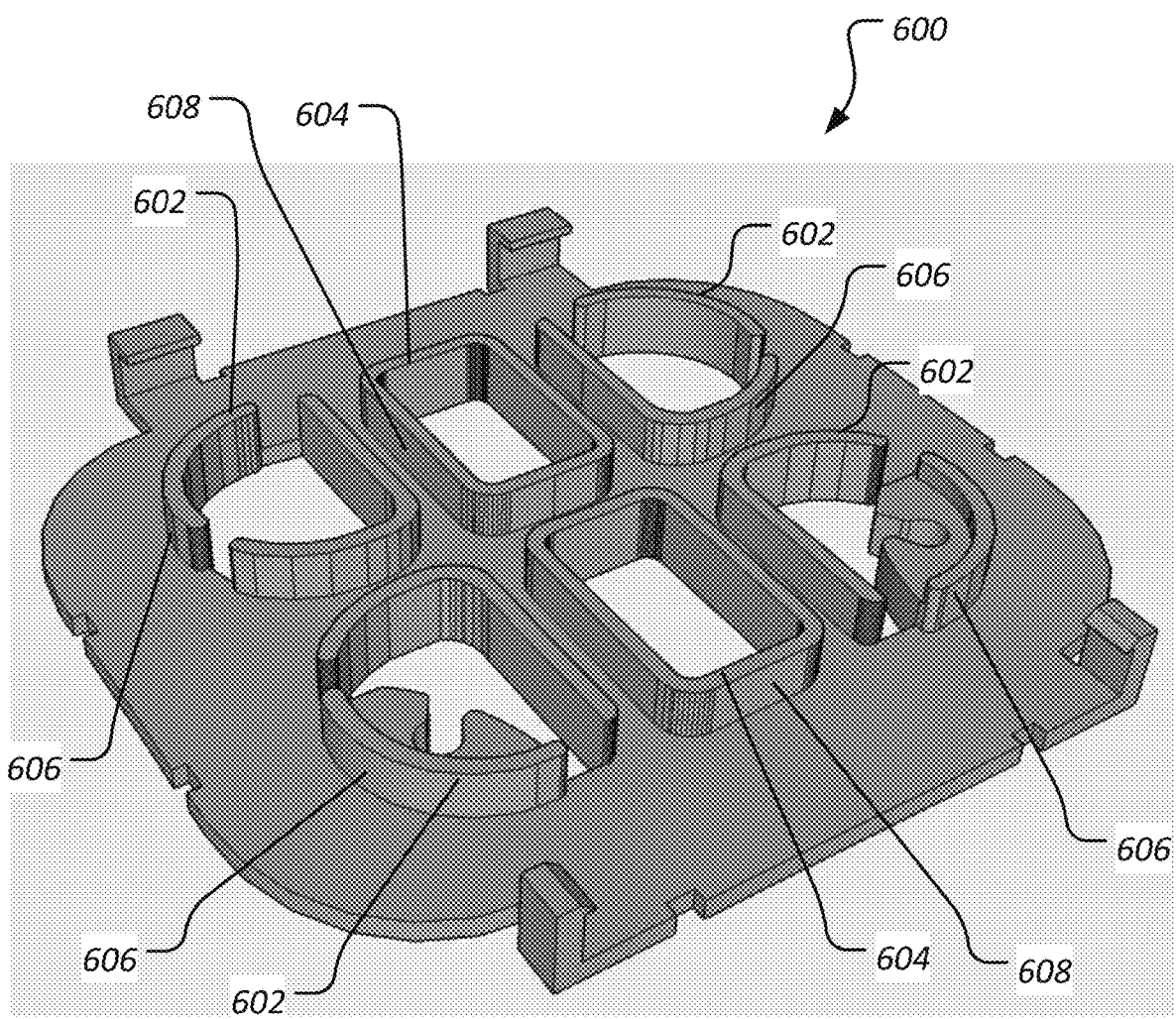
FIGS. 27-29 show an alternative embodiment of a catch unit comprising D-shaped protrusions and rectangular protrusions.
Figure 28:
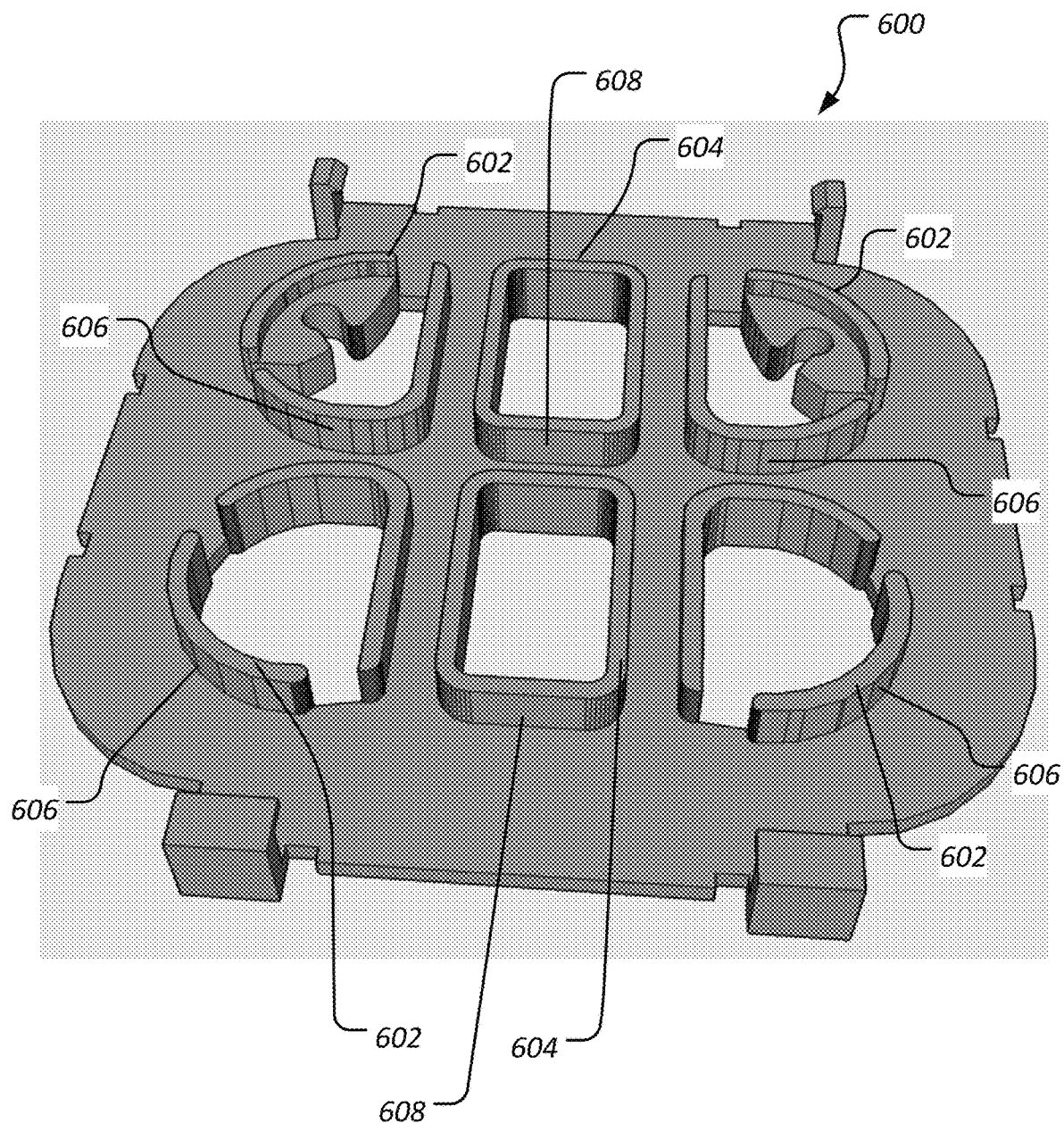
Figure 29:
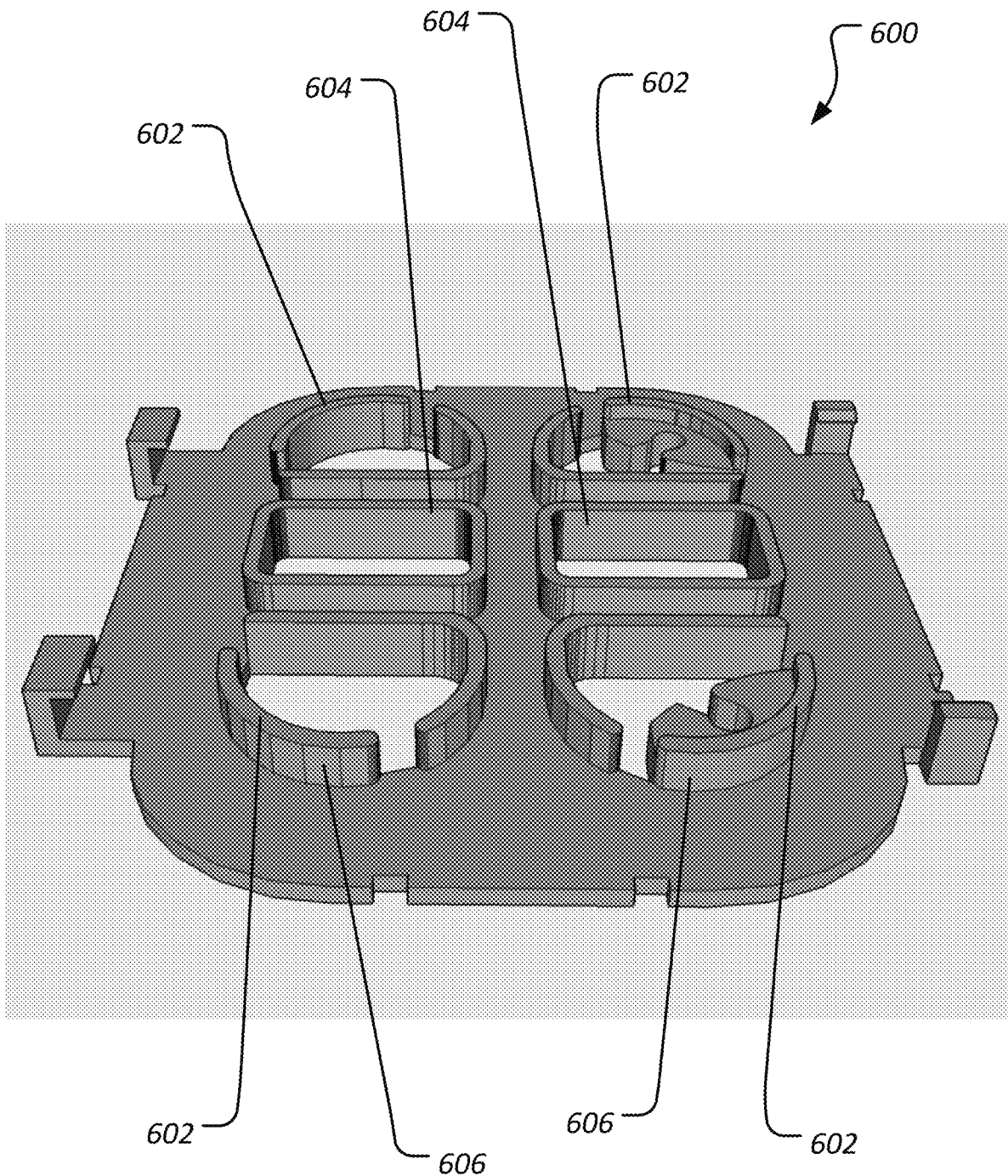

Referring now to FIGS. 27-29, an alternative embodiment of an insert member 600 is shown. The insert member 600 is configured to cooperate with a clasp member substantially similar to clasp member 502. The insert member 600 is substantially similar to the insert member 504, but rather than comprising four D-shaped protrusions, the insert member 600 comprises four similarly sized D-shaped protrusions 602 and two substantially rectangular shaped protrusions 604. The D-shaped protrusions 602 comprise D-shaped profiles 606 and the rectangular shaped protrusions 604 comprise rectangular shaped profiles 608. It will be appreciated that the protrusions 602, 604 can be somewhat segmented to allow for zip tie fasteners or other fasteners to be received through gaps formed in the protrusions 602, 604. While the operation of the insert member 600 is substantially similar to the operation of the insert member 504, the space provided between adjacent protrusions 602, 604 allows for the insert member to more easily receive fence material 11 therebetween that has a complementary configuration, pattern, and/or profile of material/apertures.

Figure 30:
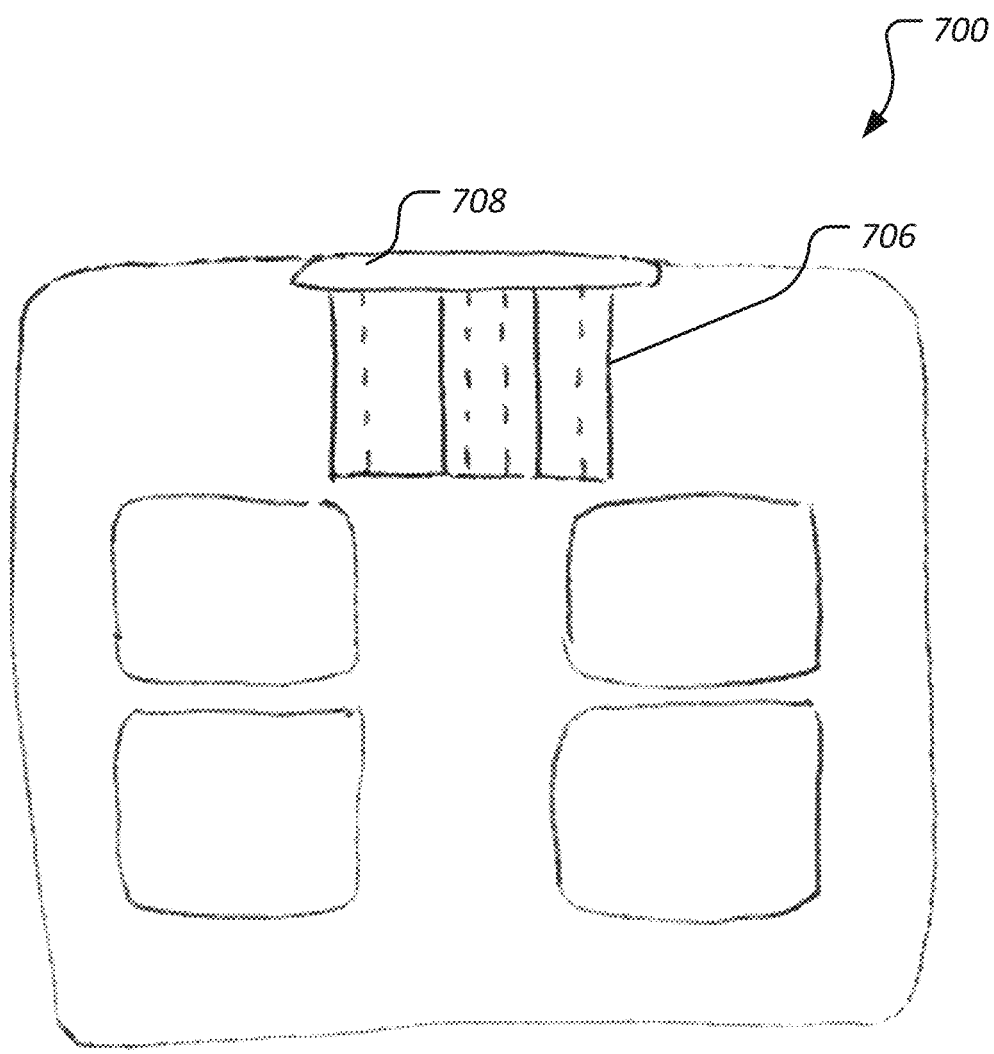
FIG. 30-32 show an alternative embodiment of a catch unit comprising a post receiver.
Figure 31:
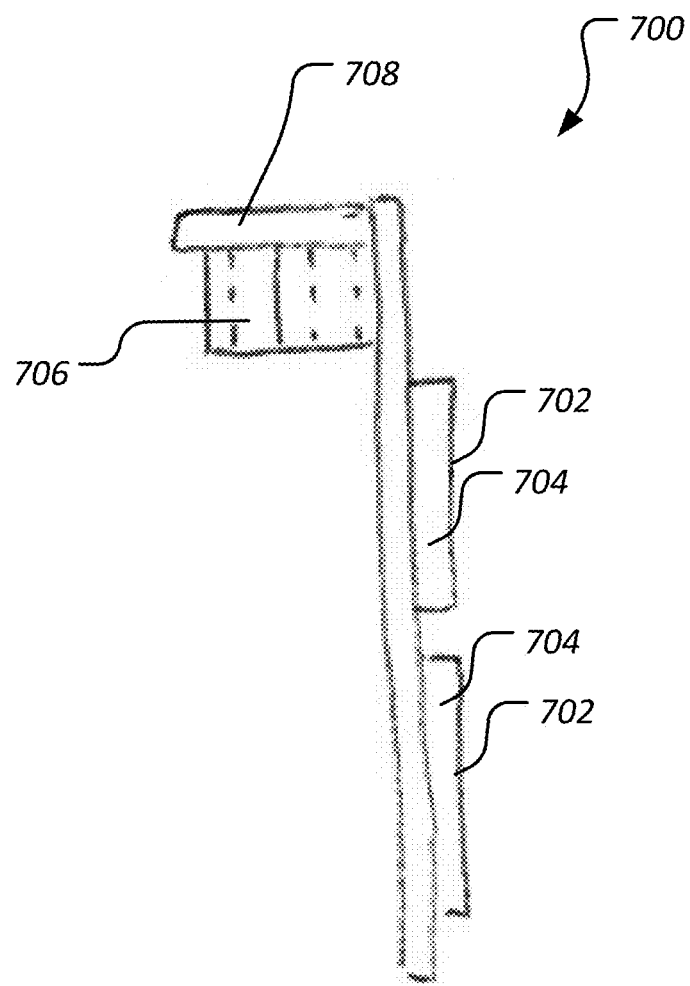
Figure 32:
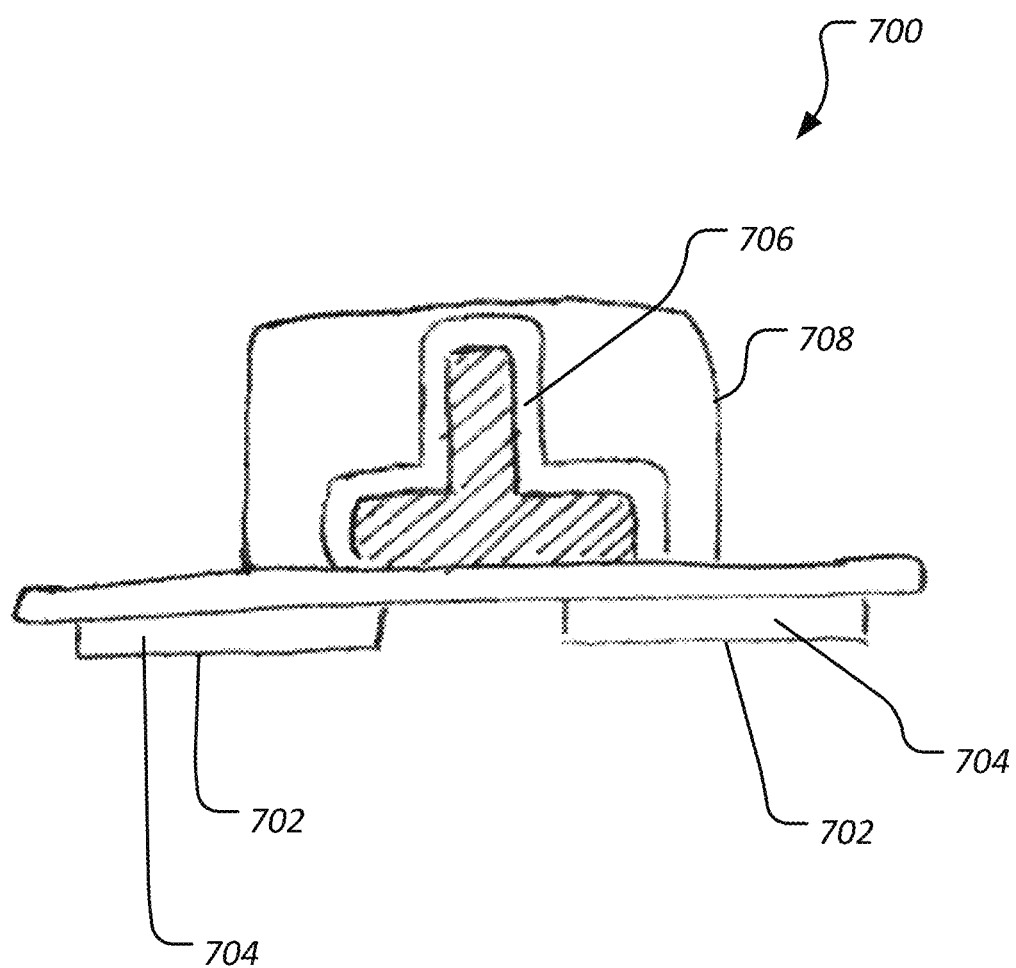

Referring now to FIGS. 30-32, an alternative embodiment of an insert member 700 is shown. Insert member 700 is substantially similar to insert member 504 but has four substantially rectangular shaped protrusions 702 comprising rectangular profiles 704. Insert member 700 further comprises a T-post receiver 706 configured as a concave receptacle for receiving an upper end of a T-post comprising a T-shaped cross-sectional area. The T-post receiver 706 can simultaneously provide a means for mounting the insert member 700 (and/an associated clasp member such as clasp member 502) as well as protect against impalement of people, animals, and/or other objects onto the top of the T-post. The insert member 700 further comprises a blocking plate 708 configured to assist in rebuffing potential impalements on the end of the T-post. It will be appreciated that while the insert member 700 is configured to accommodate a top end of a T-post, in alternative embodiments, an insert member 700 can be configured to receive any other shape into a post receiver or vertical support receiver configured to similarly provide a mounting means and/or an impalement protection means. In an alternative embodiment, the protrusions of the insert member 700 can comprise an at least partially D-shaped protrusion. Also, any of the insert members and/or clasp members can be modified to comprise a vertical support receiver, whether the receiver is configured to receive a T-post or other shaped post and/or vertical support.

It will be appreciated that the terms catch unit and insert member can be used substantially interchangeably herein. It will be further appreciated that the terms retainer unit and clasp member can be used substantially interchangeably. Further, at least three insert members or catch units are disclosed herein that comprise different protrusion shapes and layouts. In some embodiments, the protrusion shapes and/or layouts and/or number of protrusions can be selected to provide enhanced compatibility with fence materials comprising a variety of aperture shapes and layouts. In other words, although specific embodiments are disclosed herein, it is contemplated that any other number, shape, and/or size of protrusions can be provided on an insert member and/or catch unit to better accommodate a fence material having a specialized or different number, shape, and/or size of apertures.

In each embodiment of the fence support systems disclosed herein, at least one of the protrusions of the catch unit or insert member provides a profile comprising a relatively large radius wall surface against which fence material 11 can be pulled against. By distributing the forces along the profile, such as the curved portions of the D-shaped profiles 508, 509, 606, the fence material can be loaded in tension with relatively more force without failing as compared to a much smaller contact surface area, such as, but not limited to, the outer cylindrical surface of a nail or other common fastener utilized to secure fence material 11. In some embodiments, the fence material 11 can be gripped tightly between an insert member and an associated clasp member to distribute tension loads on the fence to the inner facing surfaces of the insert member and clasp member, thereby further increasing tension forces the fence material can withstand without failing (i.e. stretching to failure and/or ripping). In some cases, the protrusion sizes are substantially similarly sized to the size of an aperture of fence material, thereby providing large radii and/or surface area for the fence material to be pulled against without unduly stretching the fence material to accept the protrusion within the apertures of the fence material.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A fence support system for securing a flexible apertured fence material to a T-post, comprising:
   a catch member comprising:
   a catch plate comprising a pair of parallel protrusions longitudinally extending from a first face thereof, each protrusion comprising a peripheral wall defining an aperture longitudinally extending therethrough,
   wherein the protrusions are arranged adjacent to one another such to form a combined periphery having curved end profiles configured to extend through an aperture of the flexible apertured fence material; and
   a retainer member comprising:
   a retainer plate comprising an aperture extending therethrough having a shape complementary to the combined periphery formed by the adjacent protrusions and receiving the protrusions therein such to capture the flexible apertured fence material therebetween; and
   a pair of opposing post receiver walls longitudinally extending across a face of the retainer plate opposite the catch member, defining a channel transverse to the retainer member aperture for receiving a flange of the T-post therein and such that a positioning bump on the T-post flange extends through the retainer member aperture and is received within the aperture of one of the protrusions when the protrusions are received within the retainer member aperture,
   wherein the retainer plate is secured to the catch plate to capture the flexible apertured fence material therebetween and the T-post flange is secured between the post receiver walls to secure the flexible apertured fence material to the T-post.

2. The fence support system of claim 1, wherein the protrusion extends substantially orthogonally from the catch plate.

3. The fence support system of claim 1, wherein the catch member comprises a tie notch configured to receive a closure device.

4. The fence support system of claim 1, wherein the retainer member comprises a tie notch configured for alignment with a tie notch of the catch member when the retainer member is substantially mated with the catch member.

5. A method of supporting an apertured fence material on a T-post, comprising:
   providing a catch member comprising a catch plate comprising a pair of parallel protrusions longitudinally extending from a first face thereof, each protrusion comprising a peripheral wall defining an aperture longitudinally extending therethrough,
   wherein the protrusions are arranged adjacent to one another such to form a combined periphery having curved end profiles configured to extend through an aperture of the fence material;
   providing a retainer member comprising:
   a retainer plate comprising an aperture extending therethrough having a shape complementary to the combined periphery formed by the adjacent protrusions and receiving the protrusions therein such to capture the fence material therebetween; and
   a pair of opposing post receiver walls longitudinally extending across a face of the retainer plate opposite the catch member, defining a channel transverse to the retainer member aperture for receiving a flange of the T-post therein and such that a positioning bump on the T-post flange extends through the retainer member aperture and is received within the aperture of one of the protrusions when the protrusions are received within the retainer member aperture;
   securing the retainer plate to the catch plate to capture the fence material therebetween; and
   securing the T-post flange between the post receiver walls to secure the fence material to the T-post.

* * * * *